(12) United States Patent
Kumar Agrawal et al.

(10) Patent No.: US 11,758,083 B1
(45) Date of Patent: Sep. 12, 2023

(54) METHODS, SYSTEMS, AND DEVICES FOR PRESENTING DEMONSTRATION OBJECTS WITHOUT MIRRORING IN A VIDEOCONFERENCE

(71) Applicant: Motorola Mobility LLC, Chicago, IL (US)

(72) Inventors: Amit Kumar Agrawal, Bangalore (IN); Bill Ryan, Libertyville, IL (US); Daniel M Vacura, Chicago, IL (US); Jeffrey S Vanhoof, Gurnee, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/709,890

(22) Filed: Mar. 31, 2022

(51) Int. Cl.
*H04N 5/262* (2006.01)
*H04L 65/403* (2022.01)

(52) U.S. Cl.
CPC ......... *H04N 5/2628* (2013.01); *H04L 65/403* (2013.01)

(58) Field of Classification Search
CPC .............................. H04N 5/2628; H04L 65/403
USPC ............................................ 348/14.02–14.09
See application file for complete search history.

(56) References Cited

U.S. PATENT DOCUMENTS

| | | | |
|---|---|---|---|
| 9,948,888 B1 * | 4/2018 | Agarwal | ................ H04N 7/152 |
| 2011/0090302 A1 | 4/2011 | Leviav et al. | |
| 2015/0264102 A1 | 9/2015 | Thapa | |
| 2019/0297126 A1 * | 9/2019 | Graziano | ................ H04L 51/08 |

OTHER PUBLICATIONS

"Google Meet Mirror/Flip Camera", Published Nov. 4, 2020 online https://chrome.google.com/webstore/detail/google-meet-mirror-flip-c/cbnfajeeaebnldmgnodjlkfeomdacjlc?hl=en.
"Motorola—Ready For", Available prior to filing of present application; Viewed online at https://www.motorola.com/we/ready-for.
Desai, et al., "Methods, Systems, and Devices for Presenting Demonstration Objects in a Videoconference", Application as filed as U.S. Appl. No. 17/670,081, filed Feb. 11, 2022.
Kemp, Steven , "VideoMirror", Published Sep. 1, 2021 online at https://chrome.google.com/webstore/detail/videomirror/lgknkdljklhkafjfekjjbldfcdnmdpkh?hl=en.
Russell, Brandon , "Galaxy S21 features wireless support for Samsung DeX on PC", Published Feb. 5, 2021 online at https://www.xda-developers.com/galaxy-s21-wireless-support-samsung-dex-on-pc/.
Pathak, Khamosh , "How to Use Your Android Smartphone as a Webcam on Windows 10", Published May 8, 2020 online at https://www.howtogeek.com/671180/how-to-use-your-android-smartphone-as-a-webcam-on-windows-10/.

* cited by examiner

*Primary Examiner* — Maria El-Zoobi
(74) *Attorney, Agent, or Firm* — Philip H. Burrus, IV

(57) ABSTRACT

A conferencing system terminal device includes a communication device electronically in communication with a content presentation companion device operating as a primary display for the conferencing system terminal device during a videoconference. An image capture device of the conferencing system terminal device captures one or more images of a subject for presentation on the content presentation companion device. One or more processors apply a mirroring function to the one or more images of the subject when operating in a normal videoconference mode of operation and, in response to one or more sensors detecting an initiation of a demonstration operation by the subject, transition to a demonstration videoconference mode of operation where application of the mirroring function to the one or more images of the subject is precluded.

20 Claims, 10 Drawing Sheets

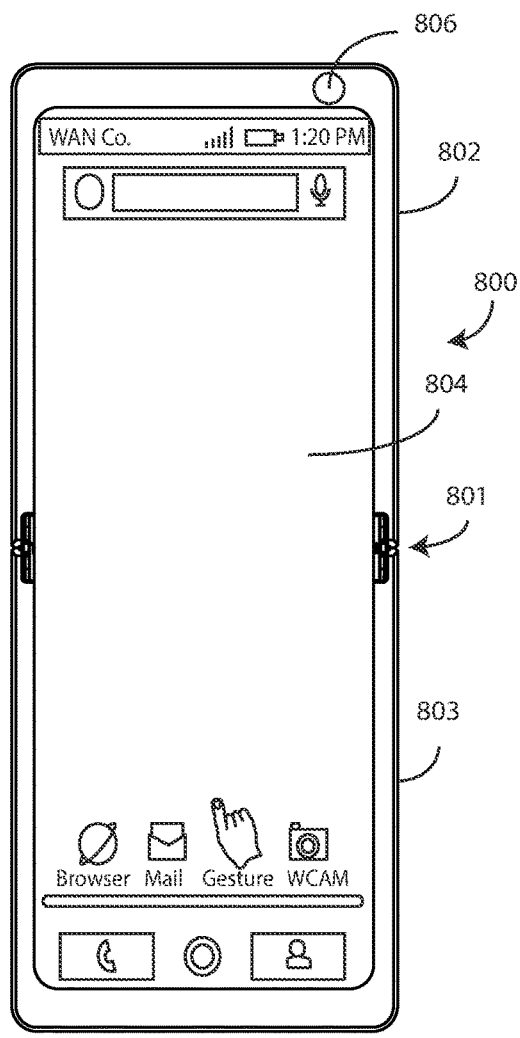
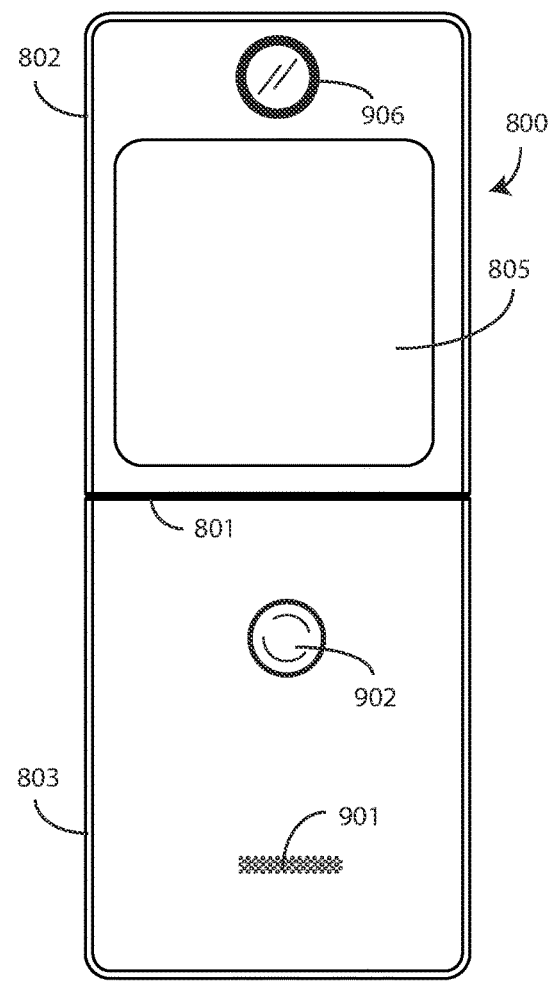
*FIG. 8*          *FIG. 9*

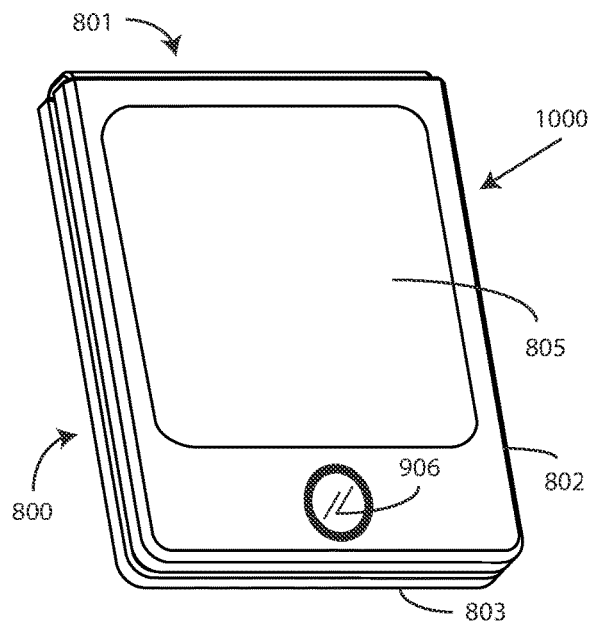
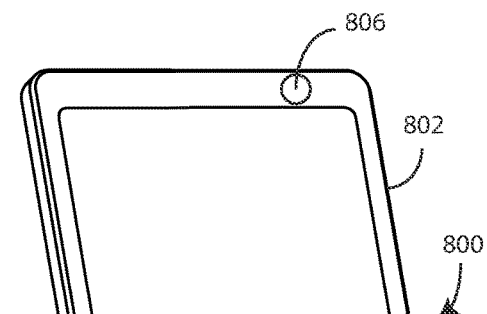
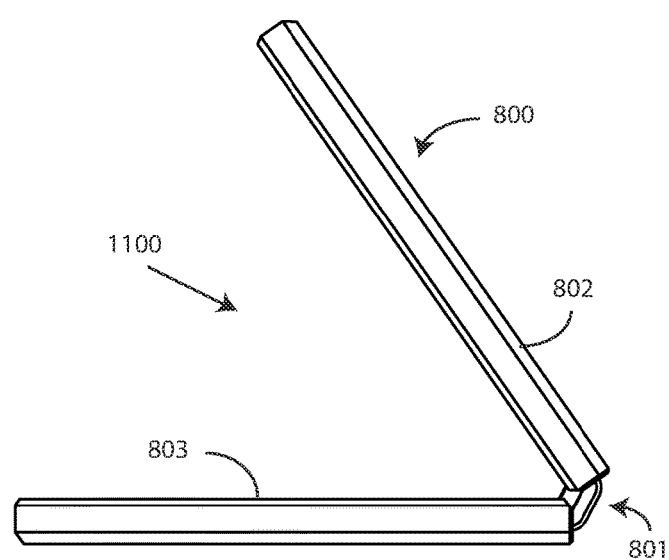
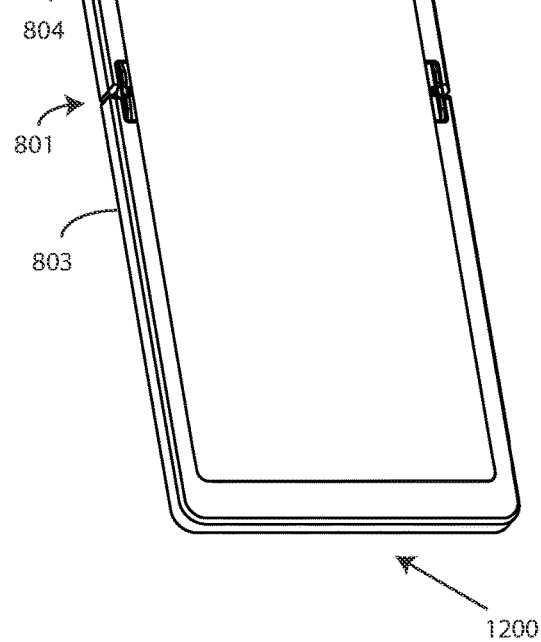
FIG. 10
FIG. 11
FIG. 12

METHODS, SYSTEMS, AND DEVICES FOR PRESENTING DEMONSTRATION OBJECTS WITHOUT MIRRORING IN A VIDEOCONFERENCE

BACKGROUND

Technical Field

This disclosure relates generally to electronic devices, and more particularly to electronic devices operable with companion electronic devices.

Background Art

The technology associated with portable electronic devices, such as smartphones and tablet computers, is continually improving. Illustrating by example, while not too long ago such devices included only grey scale liquid crystal diode displays with large, blocky pixels, modern smartphones, tablet computers, and even smart watches include vivid organic light emitting diode (OLED) displays with incredibly small pixels.

While these OLED displays offer extremely high contrast ratios capable of presenting high dynamic range images and videos, their size remains limited so that these devices can be easily carried in a hand, pocket, or backpack. To enable content received by these devices to be more easily seen, some portable electronic devices include a content redirection feature. Using the content redirection feature, content may stream through a portable electronic device such as a smartphone, but then be redirected to a larger display.

While great for watching content, the user interface settings associated systems employing a smartphone as an image capture device and a companion device as a larger display can sometimes be static. Making setting adjustments can require multiple steps and can be tedious and time consuming, especially when engaged in an activity such making a presentation in a videoconference. It would be advantageous to have an improved electronic device with enhanced user interface features that allowed such activities to become more intuitive and seamless.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 8 illustrates the front side of another explanatory electronic device in accordance with one or more embodiments of the disclosure.

FIG. 9 illustrates the rear side of the electronic device of FIG. 8.

FIG. 10 illustrates the electronic device of FIG. 8 in a closed position.

FIG. 11 illustrates the electronic device of FIG. 8 in a partially open position.

FIG. 12 illustrates the electronic device of FIG. 8 in an axially displaced open position.

Figure 1:
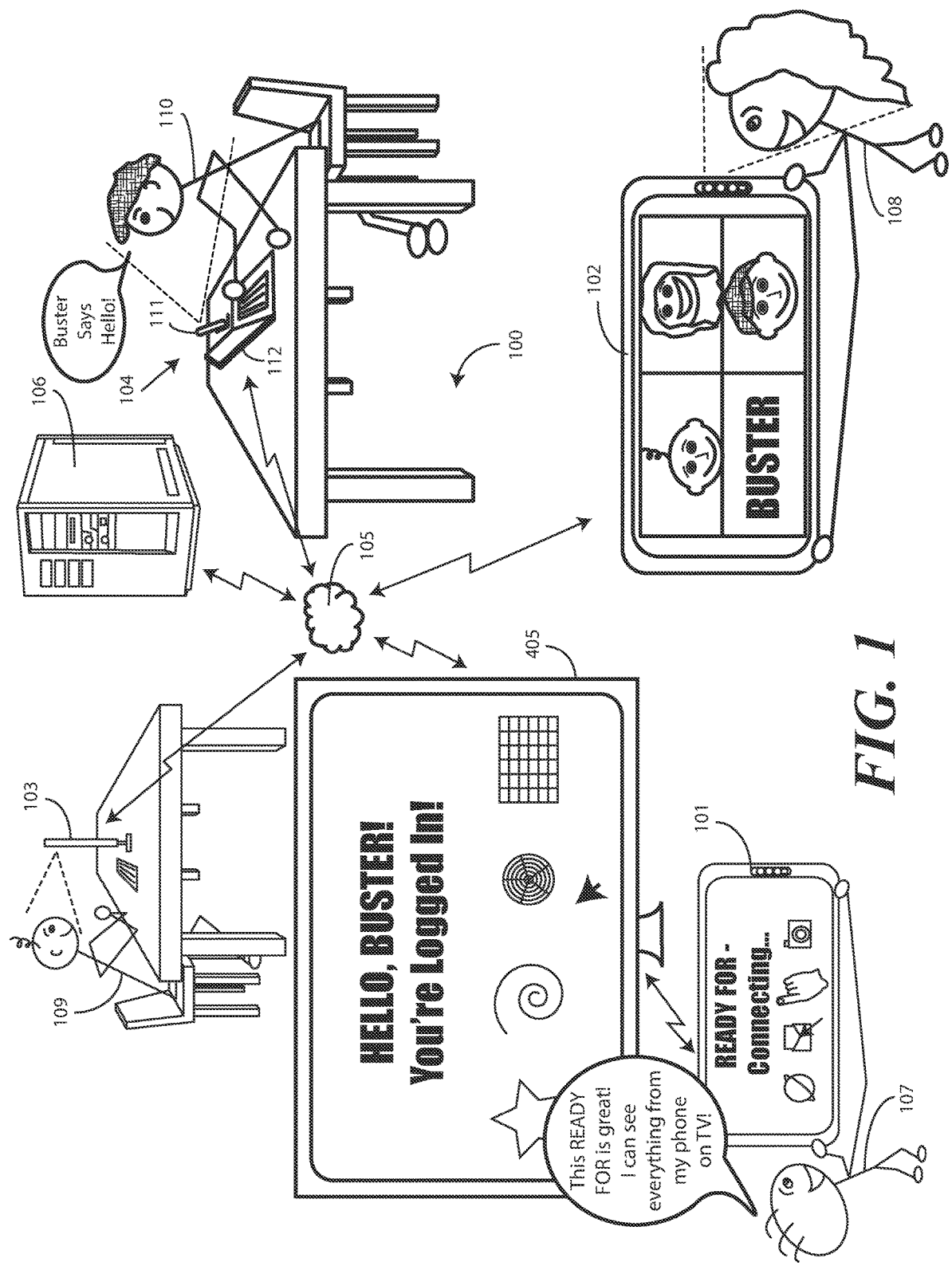
FIG. 1 illustrates one explanatory conferencing system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to, applying a mirroring function to one or more images captured by an image capture device of a conferencing system terminal device when operating in a normal videoconference mode of operation and, in response to one or more sensors detecting initiation of a demonstration operation, transitioning the conferencing system terminal device to a demonstration videoconference mode of operation where application of the mirroring function to the one or more images is precluded. In effect, embodiments of the disclosure prevent a mirroring function from occurring upon detecting the initiation of a demonstration operation using a demonstration object so that the subject performing the demonstration object can see their own image in the same way that the other participants of the videoconference see the subject. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of applying, by one or more processors of the conferencing system terminal device, a mirroring function to one or more images from an environment of the conferencing system terminal device when operating in a normal videoconference mode of operation and, in response to one or more sensors of the conferencing system terminal device detecting initiation of a demonstration operation employing a demonstration object occurring in the environment of the conferencing system terminal device transitioning, by the one or more processors from the normal videoconference mode of operation to a demonstration videoconference mode of operation and precluding application of the mirroring function to the one or more images from the environment being presented on a content presentation companion device. The non-processor circuits may include, but are not limited to, analog or digital video processing circuits, analog or digital audio processing circuits, a radio receiver, a radio transmitter, signal drivers, clock circuits, power source circuits, and user input devices.

As such, these functions may be interpreted as steps of a method to perform the application of the mirroring function to the one or more images when operating in the normal videoconference mode of operation and, in response to one or more sensors detecting initiation of a demonstration operation by a subject depicted in the one or more images, transitioning the conferencing system terminal device to a demonstration videoconference mode of operation where application of the mirroring function to the one or more images is precluded. Alternatively, some or all functions could be implemented by a state machine that has no stored program instructions, or in one or more application specific integrated circuits (ASICs), in which each function or some combinations of certain of the functions are implemented as custom logic.

Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

In response to the SARS-CoV-2 pandemic, never before have employees worked remotely on such a massive scale. When millions of companies shifted to fully remote working conditions in a short period of time to slow the spread of the Coronavirus Disease 2019, videoconferencing became the logical solution for connecting the remote workforce and keeping teams productive from home. In a matter of weeks, video conferencing usage exploded, permeating nearly all aspects of professional and personal life. In addition to business-related meetings, remote teams around the globe began using video conferencing to host virtual happy hours, ice breaker activities, online games, wine tastings, birthday parties, and other social activities.

Many modern electronic devices, including smartphones, tablet computers, and laptop computers, are equipped to engage in videoconferences or video "chats" across networks with other electronic devices. Users employ such devices to communicate with friends, family, and work colleagues. As noted above, this is especially true during times of pandemic, when people communicate remotely rather than face to face. Illustrating by example, some studies suggest that while a majority of Americans routinely use videoconferences during the SARS-CoV-2 pandemic, over a third of those users had never used a videoconference platform prior to the pandemic occurring.

Modern smartphones are equipped with some of the best digital cameras in the consumer market. Newer devices generally offer the use of the latest imaging sensor and lens component technology to capture images or video that reveal fine details with excellent colors, even in low light environments. Many smartphones are even equipped with multiple cameras that allow the collective system to focus on a single subject—even in extreme zoom configurations—without losing any details. These systems also allow a user to greatly expand the field of view to capture more of a scene.

In addition to these high-quality image capture devices, most smartphones are also equipped with advanced graphics processors, dedicated artificial intelligence (AI) engines, and additional hardware sensors capable of detecting orientation and movement. With all of this power, users of such devices increasingly rely upon the same for most of their photograph and video capture needs.

Despite this phenomenal photographic power, many people engaged in videoconferences default to using a lower quality laptop image capture device or simple, off-the-shelf "webcam," either of which offers inferior performance when compared to the most recent smartphone devices. The use of such cameras results in suboptimal videoconference image capture.

Embodiments of the disclosure provide a solution to this problem that encourages the use of a smartphone imager with a complementary auxiliary display for videoconferencing and video chatting. Embodiments of the disclosure accomplish this by equipping the smartphone with the capabilities to provide images captured by the image capture device of the smartphone with a mirroring function when operating in a normal videoconference mode of operation, but without the mirroring function when operating in a demonstration videoconference mode of operation. Thus, if a participant in a videoconference is executing a demonstration operation using a document with text as a demonstration object, by precluding the application of the mirroring function the text runs left to right in their preview image rather than running right to left (backwards) as it would when the mirroring function is being applied. Advantageously, embodiments of the disclosure allow a videoconference participant to execute a demonstration operation using a demonstration object having text that reads intuitively left to right in their preview pane so that pointing to a particular text selection during the demonstration operation becomes easier and more intuitive.

In one or more embodiments, a conferencing system terminal device includes a communication device electronically in communication with a content presentation companion device operating as a primary display for the conferencing system terminal device during a videoconference. An image capture device of the conferencing system terminal device captures one or more images of a subject for presentation on the content presentation companion device during the videoconference. In one or more embodiments, the subject is a participant in the videoconference.

In one or more embodiments, the conferencing system terminal device has one or more sensors and one or more processors. The one or more processors apply a mirroring function to the one or more images of the subject when operating in a normal videoconference mode of operation and, in response to the one or more sensors detecting the initiation of a demonstration operation by the subject, transition the conferencing system terminal device to a demonstration videoconference mode of operation where application of the mirroring function to the one or more images of the subject is precluded. In one or more embodiments, the one or more processors transition from the demonstration videoconference mode of operation back to the normal videoconference mode of operation, again applying the mirroring function to the one or more images of the subject, in response to the one or more sensors detecting a cessation of the demonstration operation.

In one or more embodiments, one or more sensors of the conferencing system terminal device initially determine whether the conferencing system terminal device is in a docked or substantially stationary position. Embodiments of the disclosure contemplate that the preclusion of the application of the mirroring function to the images being captured by the image capture device may only be desirable for instances where the conferencing system terminal device is being used as an image capture device during a videoconference or other video-based chat or communication activities. Embodiments of the disclosure contemplate that when this is occurring, the electronic device will typically be docked or stationary. Accordingly, in one or more embodiments the preclusion of the application of the mirroring function to the one or more images occurs only when the electronic device is substantially stationary or docked.

In one or more embodiments, one or more processors of the electronic device then determine that the conferencing system terminal device is in communication with a content presentation companion device that is acting as a primary display for the conferencing system terminal device. Optionally, using gravity sensors, orientation detectors, or other sensors, the one or more processors determine a geometric orientation of the electronic device in three-dimensional space and/or a geometric form factor of the electronic device to determine which image capture device of the conferencing system terminal device is capturing images of a subject and, if other image capture devices are being used as well, which other image capture devices are being used to capture images of things other than the subject or participant of the videoconference.

Embodiments of the disclosure then detect, with a demonstration operation monitoring engine in one or more embodiments, the initiation of a demonstration operation for one or more videoconference feeds. This can occur in a variety of ways. In one or more embodiments, the demonstration operation monitoring engine uses a camera as a sensor to identify a videoconference participant picking up an object and moving it to and/or within a field of view of the camera, thereby making the object a point of interest within that field of view.

In other embodiments, the demonstration operation monitoring engine can monitor audio signals being captured and transmitted during the videoconference to identify commands that indicate the initiation of a demonstration operation. Illustrating by example, a videoconference participant may say, "let me show you how this function works on this device" while moving the device into the field of view of a camera to indicate that a demonstration operation using the device as the demonstration object will commence.

In still other embodiments, the demonstration operation monitoring engine can provide a preview mode to a videoconference participant where no mirroring function is applied to the image feed defining the preview mode. This preview mode automatically identifies and tags videoconference participants and objects such as faces, torsos, dogs, cats, electronic devices, charts, figures, models, and other demonstration objects within the field of view of a camera. A videoconference participant can then select which of these objects are the demonstration object so that the demonstration operation monitoring engine can unblur the same.

In one or more embodiments, once the demonstration operation monitoring engine detects the initiation of a demonstration operation for one or more videoconference feeds, the demonstration operation monitoring engine can preclude the application of any mirroring function to images depicting the demonstration operation, thereby allowing the demonstration object to be naturally visible in the one or more images. Thus, if the demonstration operation is a book with a title on it, it will appear to the person performing the demonstration operation with the title running from left to right rather than backwards, running from right to left. If the person needs to point to a word in the title or image on the book, they will be able to do so without mentally "reversing" the process to have to think "left is right, and right is left" to accurately point to the same word or image. This results in the person looking more polished, professional, and smooth in a videoconference than when they are fumbling around with a mirrored image where the word "Buster" appears "retsuB" with those letters turned around as well.

Embodiments of the disclosure work both with conferencing system terminal devices having fixed housings that do not bend or fold and deformable housings where the geometric form factor of the electronic device can be changed by bending, folding, or other operations. Illustrating by example, a method suitable for a "candy bar" device with a fixed housing that does not bend or fold can include detecting, with one or more processors of the electronic device, a communication device of the electronic device electronically in communication with a content presentation companion device operating as a primary display for the electronic device while an image capture device of the electronic device captures one or more images from an environment of the electronic device for presentation on the content presentation companion device. One or more processors of the electronic device can apply a mirroring function to the one or more images when operating in a normal videoconference mode of operation. The one or more processors can then, in response to one or more sensors detecting a demonstration operation employing a demonstration object occurring, transition from the normal videoconference mode of operation to a demonstration videoconference mode of operation and preclude application of the mirroring function to the one or more images.

However, when a "clamshell" device with a first device housing that is pivotable relative to a second device housing about a hinge between a closed position and an axially displaced open position, embodiments of the disclosure can first determine a geometric form factor of the electronic device and/or geometric orientation of the electronic device in three-dimensional space to determine which image capture device is oriented toward the subject prior to detecting demonstration objects. In one or more embodiments, a first image capture device is situated on a first surface of the electronic device and has a first field of view extending away from the first surface in a first direction. A second image capture device is situated on a second surface of the electronic device and has a second field of view that extends away from the second surface in a second direction that is different from the first.

In one or more embodiments, one or more processors of the electronic device select an image capture device from the first image capture device and the second image capture device that is oriented toward a subject and cause the selected image capture device to capture one or more images for presentation on a content presentation companion device during a videoconference. The one or more processors apply a mirroring function to the one or more images when operating in a normal videoconference mode of operation and, in response to one or more sensors of the electronic device detecting a demonstration operation by the subject, transition to a demonstration videoconference mode of operation where application of the mirroring function to the one or more images is precluded. Advantageously, a person can intuitively and quickly point to, gesture towards, and use a demonstration object by signaling that a demonstration operation will begin in a natural and conversational manner. The person can also instinctively use the demonstration object without diverting from their presentation, thoughts, or comments.

As noted above, detection of the demonstration operation can occur in a variety of ways. In one or more embodiments, the one or more sensors detect the initiation of the demonstration operation by detecting a hand of the subject moving into the field of view of the image capture device. In another embodiment, the one or more sensors detect the initiation of the demonstration operation by detecting the hand of the subject holding an object and moving into the field of view of the image capture device. In still other embodiments, the one or more sensors detect the initiation of the demonstration operation by detecting the hand of the subject picking up the object and moving the object within the field of view of the image capture device.

The one or more sensors can also detect the initiation of the demonstration operation from contextual information. This contextual information can be detected during the videoconference and prior to the communication device transmitting the images to the at least one remote electronic device engaged in the videoconference. Examples of such contextual information include audio content received by the one or more sensors that includes an indication that the demonstration operation will commence, e.g., "let me show you this." Other examples of such contextual information can include image processing. Illustrating by example, one or more processors may analyze images to read text presented on slides indicating that a demonstration operation will commence, and so forth.

In one or more embodiments, a method configured in accordance with embodiments of the disclosure determines that a videoconference participant is actively engaged in a videoconference with their outgoing video feed turned ON. The method then applies a mirroring function to the one or more images being used in the videoconference when operating in a normal videoconference mode of operation.

The method then detects a demonstration operation commencing. This can be detected using a camera sensor to identify the videoconference participant picking up a demonstration object and moving it in front of the image capture device to indicate that the demonstration object is a point of interest, by using audio processing techniques to process received audio input indicating an intention to initiate a demonstration operation, or by providing a preview without mirroring of any detected objects to the videoconference participant so that the participant can select an object to be used as a demonstration object. Other techniques will be described below. Still others will be obvious to those of ordinary skill in the art having the benefit of this disclosure. The one or more processors can then transition from the normal videoconference mode of operation to the demonstration videoconference mode of operation, which precludes the application of the mirroring function, for as long as the demonstration operation using the demonstration object continues.

Advantageously, by presenting the demonstration object to the person executing the demonstration operation in the same way that the same is presented to the other videoconference participants, embodiments of the disclosure automatically and dynamically allow a videoconference participant to intuitively show demonstration objects to others. Other advantages will be described below. Still others will be obvious to those of ordinary skill in the art having the benefit of this disclosure.

In one or more embodiments, a videoconferencing system supports speech detection and audio transcription. These features could be performed in a conferencing system terminal device engaged in the videoconference or, alternatively, by a videoconferencing server complex. In one or more embodiments, one or more processors of the conferencing system terminal device or the videoconferencing server complex perform operations to extract contextual information from the transcription of the speech present in the audio feed of the videoconference. Illustrating by example, the one or more processors may detect the words "here, I'll show it to you," or "look at this device," or "look at this chart" from the transcription.

Contextual information can also be extracted from the video feed associated with the videoconference as well in one or more embodiments. Examples of such contextual information include the depictions of a person picking up an object, depictions of a person moving an object into a field of view of an image capture device, depictions of a person moving an object closer to an image capture device, and so forth. Other examples of contextual information that may be extracted from the video feed include depictions of new objects appearing within the field of view of an image capture device, changes in lighting conditions due to the presence of new objects in the field of view, changes in the color palette associated with a particular video feed due to a demonstration operation starting, new shapes appearing around the participant, and so forth. In one or more embodiments, contextual information can also be extracted from external sources such as cloud servers, networked servers, other electronic devices, social media servers, and so forth.

In one or more embodiments, once this contextual information is extracted and/or obtained, one or more processors of one or both of a conferencing system terminal device or a videoconference server complex preclude the application of any mirroring function, thereby leaving detected demonstration objects naturally visible to the person performing the demonstration operation, and as seen by other participants of the videoconference.

Turning now to FIG. 1, illustrated therein is one explanatory videoconference system 100 in accordance with one or more embodiments of the disclosure. As shown, multiple participants 107,108,109,110 each employ their own respective conferencing system terminal device 101,102,103,104 to engage with the other participants via the videoconference.

In this illustrative embodiment, conferencing system terminal devices 101,102 are shown as smartphones, while conferencing system terminal device 103 is shown as a desktop computer. Participant 107 is using a content presentation companion device 113 as an auxiliary display for his conferencing system terminal device 101. While this system provides one explanatory configuration of electronic devices engaged in a videoconference, conferencing system terminal devices suitable for use in the videoconference system can take other forms as well. For instance, tablet computers, notebook computers, audiovisual devices, mobile phones, smart watches, or other devices can be used by participants to engage in the videoconference as well. Other examples of conferencing system terminal devices will be obvious to those of ordinary skill in the art having the benefit of this disclosure.

Participant 110 is also using a hybrid system where his tablet computer 111 is serving as a "webcam" for his laptop computer 112, which is serving as a primary display device. Said differently, the tablet computer 111 is acting as the image capture device for the hybrid system, while the laptop computer 112 operates as a content presentation companion device serving as a primary display for the tablet computer 111. By doing this, participant 110 leverages the incredibly high quality of the image capture device built into his tablet computer 111 while viewing images captured by this image capture device, as well as image content received from the other conferencing system terminal devices 101,102,103 across the network 105, on the larger display of the laptop computer 112.

As shown in FIG. 1 each conferencing system terminal device 101,102,103,104 is engaged in wired or wireless communication with each other across a network 105, one example of which is the Internet via the World Wide Web. It should be noted that the network 105 could be a public, private, local area, wide area, or other type of network across which wired or wireless electronic communications can be exchanged.

In this illustrative embodiment, each conferencing system terminal device 101,102,103,104 is also in communication with a video conferencing system server complex 106 across the network 105. In one or more embodiments video conferencing system server complex 106 includes components such as a web server, a database server, an audio server, and optionally a video server (the video server may be omitted for audio only conferencing systems) that are operable to facilitate videoconferences between the various conferencing system terminal devices 101,102,103,104 of the videoconference system.

These components of the video conferencing system server complex 106 can be combined on the same server. Alternatively, these components can be distributed on any number of servers to increase load handling capacity beyond that of a single server, and so forth. Other configurations for the video conferencing system server complex 106 will be obvious to those of ordinary skill in the art having the benefit of this disclosure.

In one or more embodiments, the video conferencing system server complex 106 performs functions such as maintaining a schedule of videoconferences, maintaining lists of participants, as well as allowing each participant's conferencing system terminal device to engage with the videoconference, and so forth. In one or more embodiments, the video conferencing system server complex 106 also facilitates the transmission of audio and video content during the occurrence of the videoconference.

In one or more embodiments, the video conferencing system server complex 106 functions as an intermediary device to facilitate sharing of audio and/or video content and/or data between the various conferencing system terminal devices 101,102,103,104. For example, as can be seen on the displays of conferencing system terminal device 102, in this example participant 108 can see each other participant engaged in the videoconference.

In the illustrative example of FIG. 1, as can be seen on the display of conferencing system terminal device 102, participants 108,109,110 are engaged in the videoconference. Participant 107 is in the process of pairing the content presentation companion device 700 with his conferencing system terminal device 101. Once paired, participant 107 will also join the videoconference.

In FIG. 1, the conferencing system terminal device 101 and the content presentation companion device 700 operate in tandem as a system, with the conferencing system terminal device 101 providing the processing power while the content presentation companion device 700 serves as an auxiliary display device for the conferencing system terminal device 101.

As shown in FIG. 1, conferencing system terminal device 101 is electronically in communication with the content presentation companion device 113. When the conferencing system terminal device 101 is electronically in communication with the content presentation companion device 113, this allows the conferencing system terminal device 101 to use the larger display of the content presentation companion device 113 to present content. Illustrating by example, in one or more embodiments the conferencing system terminal device 101 can operate in a "content redirection" mode by presenting content such as movies, videos, videoconferences. images, and even a traditional computer user interface, on the display of the content presentation companion device 113. The hybrid system being used by participant 110 functions in a similar manner.

Embodiments of the disclosure contemplate that with the advanced computing power available in smartphones and other electronic devices, users often consume movies, videos, television shows, and other content, including videoconference content, using these devices. By establishing an electronic communication channel between the conferencing system terminal device 101 and the content presentation companion device 113, the processing power of the conferencing system terminal device 101 can be leveraged to present content on the display of the content presentation companion device 113. This allows videoconference participant 107 to use the display of the content presentation companion device 113 to engage in the videoconference of FIG. 1. Participant 110 similarly uses the display of the laptop computer 112 for the presentation of images captured by the tablet computer 111.

Since the participants 108,109,110 are all engaged in a videoconference, each can see conference content in the form of a combined video feed from each other participant 108,109,110 presented on the display of each conferencing system terminal device 102,103,104, as well as a video feed of themselves. Under ordinary conditions, each participant 108,109,110 can hear an audio feed from each other participant 108,109,110 as well.

In this illustrative embodiment, participant 110 is acting as a presenter, and is speaking, noting that a friend, Buster, "says hello." The presenter's tablet computer 111 captures images of the presenter while speaking in the form of video and may optionally capture the audio as well. Either the tablet computer 111 or the laptop computer 112 can optionally transmit this video and audio of the presenter to the other conferencing system terminal devices 101,102,103 via the video conferencing system server complex 106. While participant 110 is the presenter at the moment, it is to be understood that the presenter role can be changed throughout the videoconference as well, with each other participant 107,108,109 taking the role of presenter at other times as situations warrant.

Figure 2:
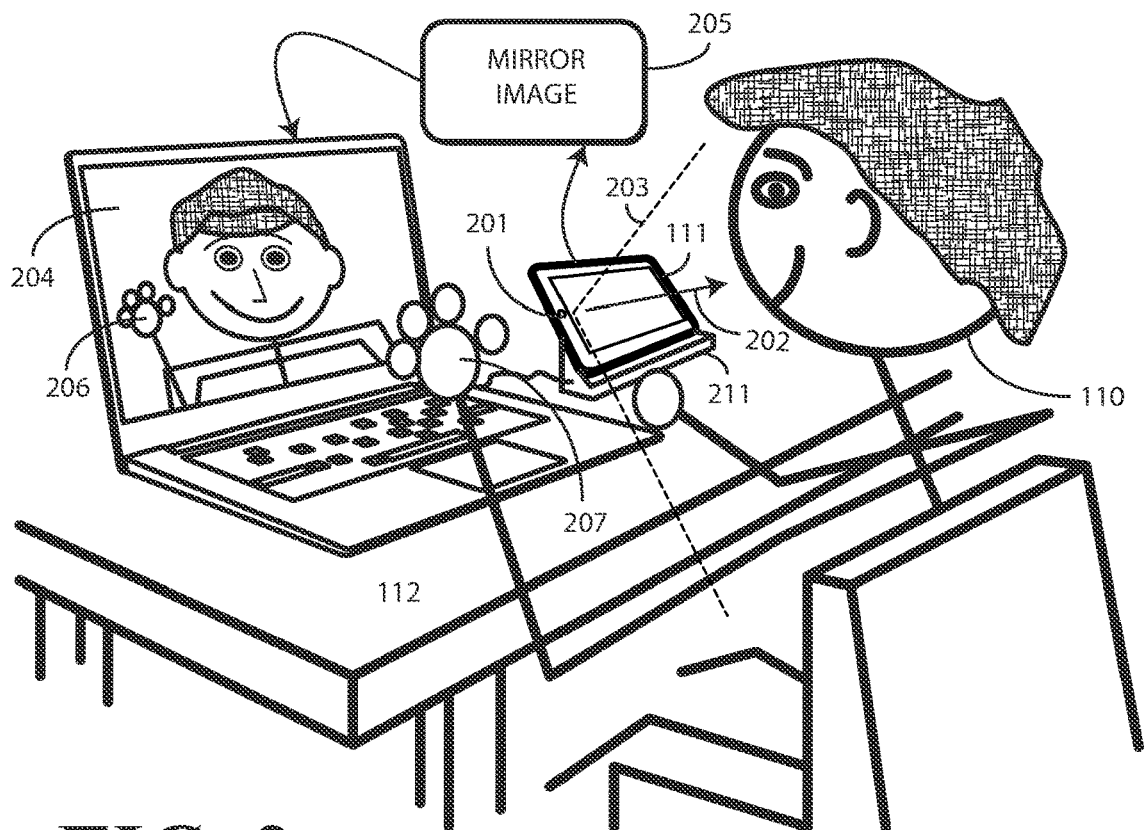
FIG. 2 illustrates one explanatory hybrid system being used in a videoconference.

This hybrid system defined by the tandem operation of the tablet computer 111 and the laptop computer 112 of FIG. 1 is illustrated in more detail in FIG. 2 Turning now to FIG. 2, the tablet computer 111 and laptop computer 112 of the hybrid system can more readily be seen.

As shown, the tablet computer 111 is in a docked configuration in that it has been coupled to a docking station 211 that is electrically coupled to the laptop computer 112. In this illustrative embodiment, the docking station 211 includes one or more electrical contacts that couple to complementary electrical contacts in the tablet computer 111 so that signals from the tablet computer 111, including signals transmitting one or more images 203 captured by an image capture device 201 of the tablet computer 111, can be transmitted to the laptop computer 112 through an electrical connection coupling the docking station 211 to the laptop computer 112, one example of which is a wire.

In other embodiments, rather than including electrical contacts, the docking station 211 will include a wireless communication circuit configured to communicate wirelessly with the tablet computer 111. Similarly, the wireless communication circuit of the docking station 211 can be configured to communicate with the laptop computer 112 wirelessly as well. In still other embodiments, the docking station 211 will be a mechanical docking station only, supporting the tablet computer 111 in an orientation in three-dimensional space where the image capture device has its field of view 202 directed toward the participant 110 using the hybrid system, with a communication device of the tablet computer 111 communicating wirelessly with the laptop computer 112 directly. Other examples of docking stations and docking station configurations will be obvious to those of ordinary skill in the art having the benefit of this disclosure.

In the illustrative example of FIG. 2, the image capture device 201 of the tablet computer 111 sits in the docking station 211 with its field of view 202 directed toward participant 110. The image capture device 201 is capturing one or more images 203 of participant 110, which are being delivered to the laptop computer 112 for presentation on the display 204 of the laptop computer 112.

One or more processors of the tablet computer 111 apply a mirroring function 205 before presenting the one or more images 203 to the participant 110. This mirroring function 205 causes the participant 110 to see the one or more images 203 on the display 204 of the laptop computer 112 as if he is looking in an actual mirror, with depictions 206 of this left hand 207 appearing on the left side of the display 204.

Figure 3:
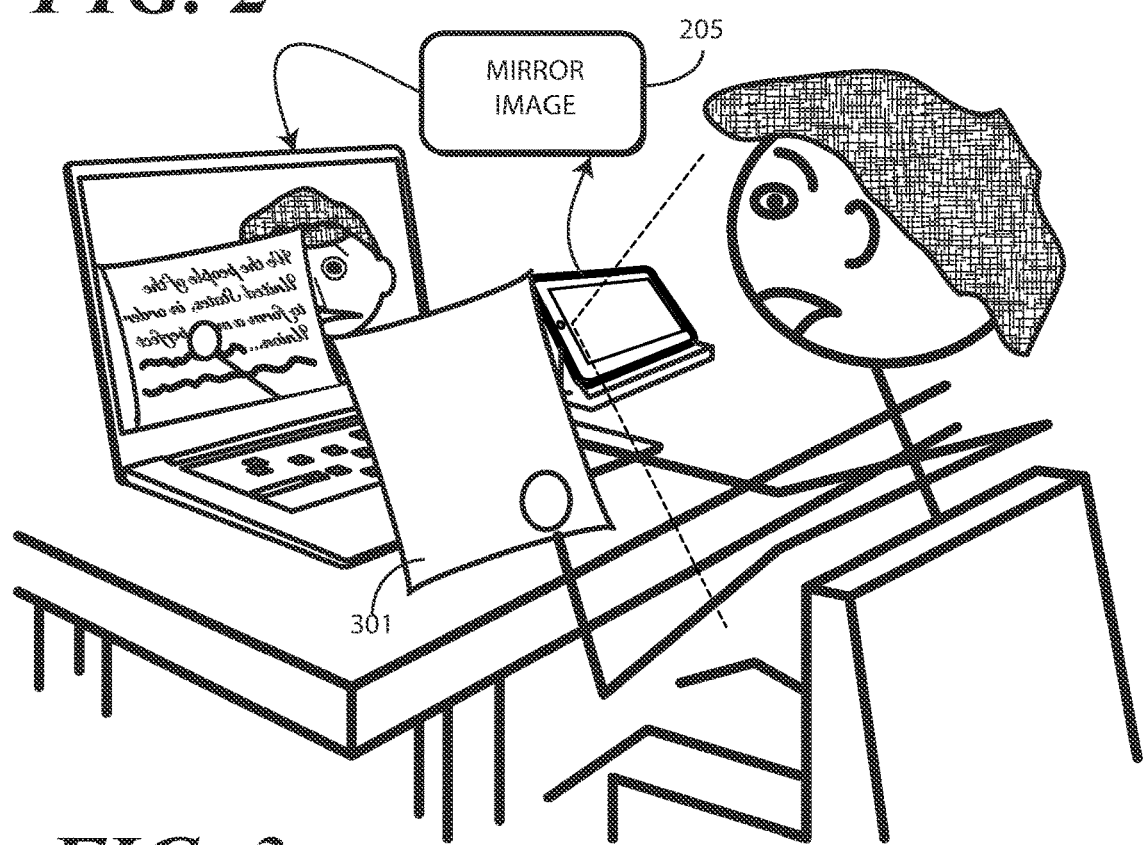
FIG. 3 illustrates an issue that can arise in one explanatory hybrid system being used in a videoconference where a mirroring function is always applied.

While this mirroring function 205 allows the user to see themself in a somewhat intuitive way, problems can arise when it is always applied. Turning now to FIG. 3, illustrated therein is the result.

When the participant 110 performs a demonstration operation using a demonstration object 301, which in this illustration is a document including text, the mirroring function 205 causes the text to run from right to left with all the letters being presented backwards rather than running from left to right in a legible manner. If the participant 110 wants to point to a particular text citation or image in the document, they must do this through a "mental gymnastics" routine where "left is right, and right is left" and "moving my hand right makes it go left" and vice versa. This can be both puzzling and confusing and can make the participant 110 seem less than professional, confident, and calm when making a presentation. In some cases, it can make the participant simply look like he doesn't have any idea what he's doing. However, this is not his fault as most people do not practice reading backwards.

Embodiments of the disclosure advantageously solve this problem by detecting the initiation of the demonstration operation using one or more sensors of a conferencing system terminal device. When the initiation of the demonstration operation is detected, one or more processors of the conferencing system terminal device then preclude the application of the mirroring function 205 for as long as the demonstration operation continues. Accordingly, by presenting the demonstration object to the person executing the demonstration operation in the same way that the same is presented to the other videoconference participants, embodiments of the disclosure automatically and dynamically allow a videoconference participant to intuitively show demonstration objects to others.

Thus, if a participant 110 in a videoconference is executing a demonstration operation using a document with text as a demonstration object, by precluding the application of the mirroring function 205 the text runs left to right in their preview image rather than running right to left (backwards) as it would when the mirroring function 205 is being applied. Advantageously, embodiments of the disclosure allow a videoconference participant 110 to execute a demonstration operation using a demonstration object having text that reads intuitively left to right in their preview pane so that pointing to a particular text selection during the demonstration operation becomes easier and more intuitive. In one or more embodiments, the one or more processors of the conferencing system terminal device transition from the demonstration videoconference mode of operation precluding the application of the mirroring function 205 back to the normal videoconference mode of operation, again applying the mirroring function 205 to the one or more images of the subject, in response to the one or more sensors detecting a cessation of the demonstration operation.

Figure 4:
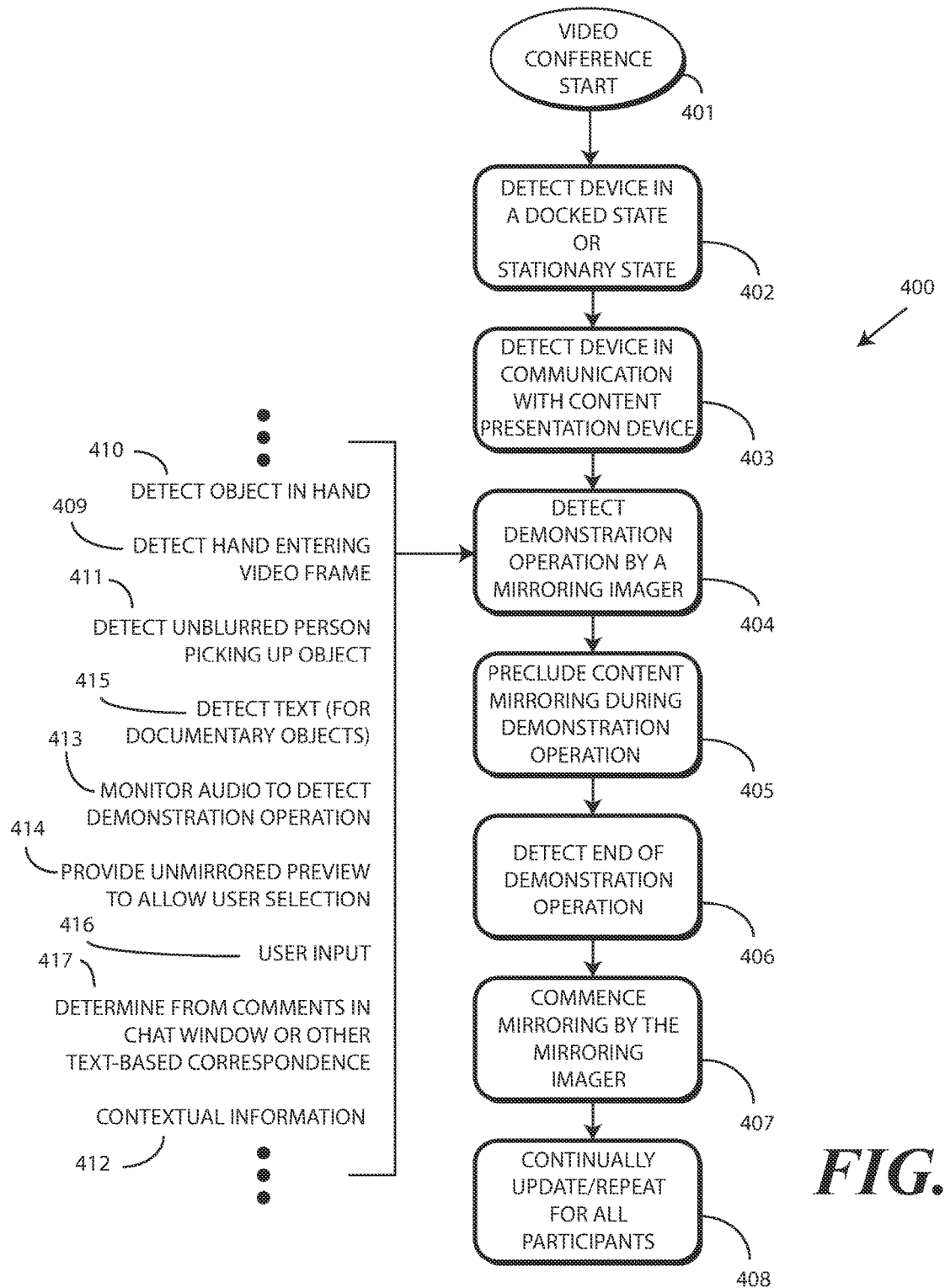
FIG. 4 illustrates one explanatory method in accordance with one or more embodiments of the disclosure.

Thus, if the demonstration operation is a book with a title on it, it will appear to the person performing the demonstration operation with the title running from left to right rather than backwards, running from right to left. Thus, if the person needs to point to a word in the title or image on the book, they will be able to do so without mentally "reversing" the process to have to think "left is right, and right is left" to accurately point to the same word or image. This results in the person looking more polished, professional, and smooth in a videoconference than when they are fumbling around with a mirrored image where the word "Buster" appears "retsuB" with those letters turned around as well. Turning now to FIG. 4, illustrated therein is one explanatory method 400 depicting how this can occur.

Beginning at stage 401, a videoconference is initiated. In one or more embodiments, the videoconference occurs across a network, one example of which is network (105) shown in FIG. 1. In one or more embodiments, the videoconference includes one or more videoconference feeds associated therewith. These videoconference feeds can include audio content and/or video content. The features described in conjunction with the method 400 of FIG. 4 using this video content and/or audio content could be performed in a conferencing system terminal device engaged in the videoconference initiated at stage 401 or, alternatively, by a videoconferencing server complex facilitating the videoconference initiated at stage 401.

In one or more embodiments, the initiation of the videoconference at stage 401 means that image capture devices of conferencing system terminal devices engaged in the videoconference begin capturing images of subjects participating in the videoconference. A communication device of the conferencing system terminal device then transmits the images to at least one remote electronic device engaged in the videoconference, optionally in conjunction with the operations of a conferencing system server complex facilitating the videoconference. Communication devices of those remote electronic devices receive one or more videoconference feeds, each of which can include an audio feed and a video feed, depicting the one or more subjects engaged in the videoconference from the other conferencing system terminal devices engaged in the videoconference.

As will be explained in more detail below with reference to FIG. 6, in one or more embodiments each conferencing system terminal device engaged in the videoconference includes an image capture device, a communication device, one or more sensors, and one or more processors. These conferencing system terminal devices can also include a contextual information extraction engine that is configured to extract contextual information from the audio content and/or video content associated with the audio and video feeds of the videoconference, respectively. The conferencing system terminal devices can also be equipped with a contextual information monitoring engine that monitors video or audio feeds for contextual information as well. Other components that can be included with the conferencing system terminal device will be described below with reference to FIG. 6. Still others will be obvious to those of ordinary skill in the art having the benefit of this disclosure.

In one or more embodiments, the conferencing system terminal device engaged in the videoconference occurring at stage 401 includes an image capture device capturing images of a subject during the videoconference occurring across a network. A communication device transmits the images to at least one remote electronic device engaged in the videoconference at stage 401.

At step 402, one or more sensors of a conferencing system terminal device detect whether the conferencing system terminal device is in a stationary or docked condition. As noted above, embodiments of the disclosure contemplate that when the conferencing system terminal device is being used as a webcam for a content presentation companion device, it will frequently be the case that the conferencing system terminal device is still—either by sitting on a desk or by being placed in a docking station. Moreover, preclusion of any mirroring function to the one or more images being captured by the image capture device of the conferencing system terminal device may only be desirable for instances where the conferencing system terminal device is being used as an image capture device for the other electronic device. Accordingly, in one or more embodiments step 402 first determines, with one or more sensors of the conferencing system terminal device, whether the conferencing system terminal device is in a docked or stationary condition.

At step 403, one or more processors of the conferencing system terminal device determine that a communication device of the conferencing system terminal device is in communication with the content presentation companion device while (1) the content presentation companion device is being used as a primary display for the conferencing system terminal device and (2) while the one or more images are being captured by the image capture device of the conferencing system terminal device.

Step 403 can also comprise determining that a videoconference participant is actively engaged in a videoconference with their outgoing video feed turned ON. In one or more embodiments, when this occurs one or more processors of the conferencing system terminal device operate in a normal videoconference mode of operation at step 403 where a mirroring function is applied to one or more images being captured by a local image capture device and presented to a participant on a display of the conferencing system terminal device. Said differently, when in the normal videoconference mode of operation, the one or more processors of each conferencing system terminal device apply a mirroring function to locally captured images depicting a subject so that the subject sees depictions of themself that are a mirror image as shown in FIG. 2 above.

At step 404, the one or more sensors of the conferencing system terminal device detect initiation of a demonstration operation by a participant. Said differently, at step 404 the method 400 then detects a demonstration operation commencing. This can occur in a variety of ways.

In one or more embodiments, the one or more sensors detect the initiation of the demonstration operation at step 404 by detecting a hand 409 of a participant moving into the field of view of an image capture device of their conferencing system terminal device. In another embodiment, the one or more sensors detect the initiation of the demonstration operation at step 404 by detecting a hand of a participant holding an object 410 moving into a field of view of an image capture device of their conferencing system terminal device. In still other embodiments, the one or more sensors detect the initiation of the demonstration operation at step

404 by detecting a hand of a participant picking up 411 an object and moving the object within the field of view of an image capture device of their conferencing system terminal device.

In other embodiments, the one or more sensors detect the initiation of the demonstration operation at step 404 by detecting contextual information 412. In one or more embodiments, the contextual information 412 is detected during the videoconference and prior to the communication device of the conferencing system terminal device transmitting any images to any remote electronic device engaged in the videoconference.

Illustrating by example, in one or more embodiments the contextual information 412 comprises audio content 413 received by the one or more sensors comprising an indication that the demonstration operation will commence. Audio processing techniques can then be used to process this audio content to determine if a participant makes comments indicative of, or identifying, the commencement of a demonstration operation. A participant may say, "hold on, let me show you this," or "look at this [insert noun of demonstration operation], I've got it right here in my hand," or "let me grab this [widget or other demonstration operation name] and I'll show it to you and so forth. These examples are illustrative other, as many other voice commands identifying or indicating the commencement of a demonstration operation using a demonstration object will be obvious to those of ordinary skill in the art having the benefit of this disclosure.

Accordingly, one or more processors of either a conferencing system terminal device or a conferencing system server complex begin a speech capture operation at step 404. In one or more embodiments a videoconferencing system supports speech detection and, optionally, audio transcription. In one or more embodiments, the one or more videoconference feeds associated with the videoconference that commences at stage 401 each have audio content associated therewith. One or more sensors of each conferencing system terminal device, one example of which is a microphone, or alternatively one or more sensors of a conferencing system server complex, capture the audio content from the one or more videoconference feeds associated with the videoconference at step 404.

The captured audio content can be analyzed and/or transcribed. Illustrating by example, where a conferencing system terminal device is equipped with a contextual information extraction engine, the contextual information extraction engine can extract contextual information of the videoconference from the one or more videoconference feeds by extracting the contextual information from transcribed audio content at step 404. Moreover, one or more processors of the conferencing system terminal device can transcribe the audio content to create transcribed audio content at step 404. Where the transcription is occurring in a conferencing system server complex instead of a conferencing system terminal device, step 404 can include a contextual information monitoring engine identifying contextual information from the transcribed audio content as well. In one or more embodiments, one or more processors of the conferencing system terminal device or the videoconferencing server complex then perform operations to extract contextual information from the transcription of the speech present in the audio feed of the videoconference at step 404 to identify the commencement of a demonstration operation.

In still other embodiments where the conferencing system terminal device includes a display, one or more processors of the conferencing system terminal device may present a preview mode on the display without the application of any mirroring function and that allows a user selection of the demonstration object.

In one or more embodiments, the demonstration object comprises a document or other substrate upon which text is presented. In such embodiments, the one or more sensors detect the initiation of the demonstration operation at step 404 by detecting text entering, moving, or appearing within the field of view of an image capture device of the conferencing system terminal device.

Thus, the one or more sensors detect the initiation of the demonstration operation at step 404 by, for example, using a camera sensor to identify the videoconference participant picking up a demonstration object and moving it in front of the image capture device to indicate that the demonstration object is a point of interest, by using audio processing techniques to process received audio input indicating an intention to initiate a demonstration operation, or by providing an unmirrored preview 414 of any detected objects to the videoconference participant so that the participant can select an object to be deblurred as a demonstration object.

Other techniques can be used as well to detect the commencement of a demonstration operation. Just as audio content can be monitored at step 404 to detect the demonstration operation, contextual information can be monitored, identified, or extracted from the video content associated with the videoconference commencing at stage 401. Illustrating by example, one or more sensors of a conferencing system terminal device can detect contextual information from the video feeds associated with the videoconference at step 404. User input 416 received from a user interface can indicate the commencement of a demonstration operation, as can information from other communication channels, such as comments placed into a chat window 417 or other text-based correspondence. Text 415 detected from a document presented within the field of view of an image capture device can be used as well.

In one or more embodiments, in response to the one or more sensors detecting initiation of a demonstration operation by the subject at step 404, at step 405 the one or more processors transition from the normal videoconference mode of operation to a demonstration videoconference mode of operation. When operating in the demonstration videoconference mode of operation, the one or more processors of the conferencing system terminal device preclude the application of a mirroring function to images being captured by a local image capture device of the conferencing system terminal device. In one or more embodiments, where the demonstration operation is an object with text, the preclusion of the mirroring function at step 405 results in depictions of the text from the one or more images of the subject on the content presentation companion device running from a left side of the content presentation companion device toward a right side of the content presentation companion device.

As noted above in the description of step 402, in one or more embodiments a docked operating condition or a substantially stationary condition or a perfectly stationary condition of the electronic device is a prerequisite for step 405 to occur. Accordingly, where optional step 402 is included, in one or more embodiments step 405 transitions to the demonstration videoconference mode of operation and precludes the application of the mirroring function while a demonstration operation detected at step 404 is occurring only when the conferencing system terminal device is substantially stationary. In one or more embodiments step 405 transitions to the demonstration videoconference mode of operation and precludes the application of the mirroring function while a demonstration operation detected at step 404 is occurring only when the conferencing system terminal device is perfectly stationary. In another embodiment, step 405 transitions to the demonstration videoconference mode of operation and precludes the application of the mirroring function while a drop detected at step 404 is occurring only when the conferencing system terminal device is coupled to a docking station and engaged in a videoconference.

Where the conferencing system terminal device includes a demonstration operation monitoring engine, step 405 can comprise one or more processors of the conferencing system terminal device precluding the application of the mirroring function in response to the demonstration operation monitoring engine detecting initiation of a demonstration operation for one or more videoconference feeds received from one or more conferencing system terminal devices of a plurality of conferencing system terminal devices. In one or more embodiments, one or both of the conferencing system terminal devices engaged in the videoconference initiated at stage 401 and/or the conferencing system server complex facilitating the videoconference initiated at stage 401 are equipped with a generative artificial intelligence engine that includes an artificial neural network or other similar technology that detects the contextual information indicating the initiation of the demonstration operation and precludes, as a function of this contextual information, application of a mirroring function to one or more video feeds associated with the videoconference initiated at stage 401 that allow a demonstration object of a demonstration operation to be seen by the participant holding the demonstration object with text running from left to right, rather than vice versa.

Regardless of whether a generative artificial intelligence engine is used, the result of step 405 is that one or more processors, in response to the one or more sensors detecting initiation of a demonstration operation by the subject at step 404, transition from the normal videoconference mode of operation initiated at step 404 to a demonstration videoconference mode of operation that precludes the application of a mirroring function to one or more images being captured by an image capture device of the conferencing system terminal device.

At step 406, the method 400 detects a cessation of the demonstration operation. At step 407, the method 400 transitions from the demonstration videoconference mode of operation to the normal videoconference mode of operation and again applies the mirroring function to one or more images being captured by an image capture device of the conferencing system terminal device. At step 408, the method 400 can repeat as additional demonstration operations or demonstration objects are detected.

It should be noted that in one or more embodiments, the mirroring function is applied at step 403, and precluded at step 405, to only locally captured images. Said differently, in one or more embodiments the mirroring function is applied at step 403, and precluded at step 405, to one or more images of a subject when those one or more images are viewed by the subject. Thus, the subject only sees a mirrored image when the mirroring function is applied. The communication device of the conferencing system terminal device transmits the one or more images of the subject to at least one remote electronic device engaged in the videoconference without the mirroring function applied to the one or more images of the subject. In one or more embodiments, the communication device of the conferencing system terminal device always transmits the one or more images of the subject to at least one remote electronic device engaged in the videoconference without the mirroring function applied to the one or more images of the subject Thus, if the demonstration object is a book with a title on it, using the method 400 of FIG. 4 the title will appear to the person performing the demonstration operation by holding the book with the title running from left to right rather than backwards, running from right to left. If the person needs to point to a word in the title or image on the book, they will be able to do so without mentally "reversing" the process to have to think "left is right, and right is left" to accurately point to the same word or image. This results in the person looking more polished, professional, and smooth in a videoconference than when they are fumbling around with a mirrored image where the word "Buster" appears "retsuB" with those letters turned around as well.

Figure 5:
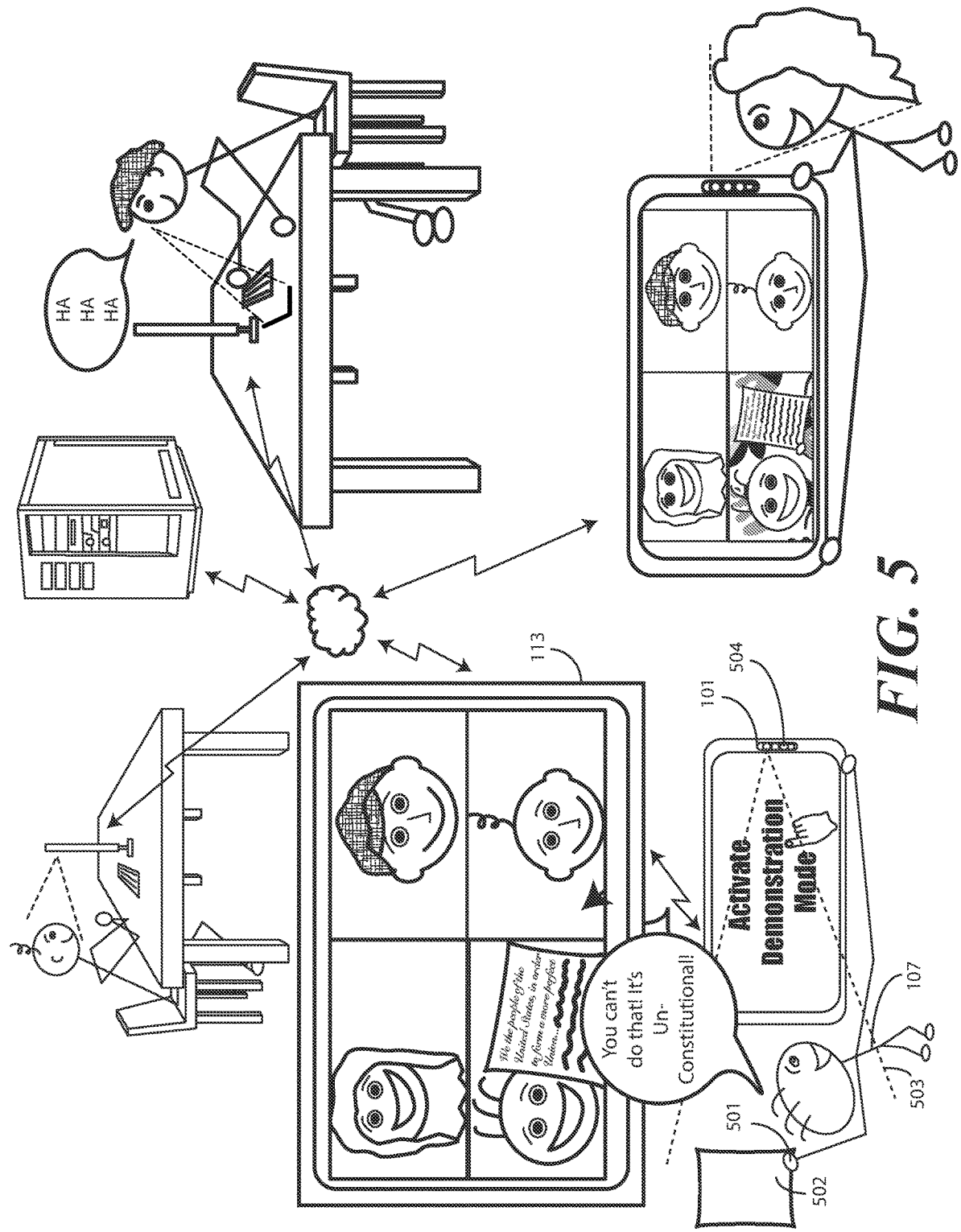
FIG. 5 illustrates one explanatory conferencing system in accordance with one or more embodiments of the disclosure.

Turning now to FIG. 5, participant 107 is using a hybrid system where a conferencing system terminal device 101 captures one or more images of participant 107 while a content presentation companion device 113 operates as a primary display for the conferencing system terminal device 101. Here, participant 107 and has fully engaged, and is participating in, the videoconference. Initially, one or more processors of the conferencing system terminal device 101 operate in a normal videoconference mode of operation where a mirroring function is applied to one or more images being captured of participant 107 by the image capture device 504 of the conferencing system terminal device 101.

Hearing that he has been assigned with a new task that he does not care for, participant 107 decides to object in a comical way. Specifically, he plans to declare the task newly assigned to him to be a violation of his rights under the United States Constitution. To make the objection even more demonstrative, participant 107 decides to perform a demonstration operation by waving a demonstration object in the form of a copy of the Constitution in front of the image capture device of his conferencing system terminal device 101.

While the demonstration operation monitoring engine of the conferencing system terminal device 101 could detect the audio including the statement "you can't do that, it's unconstitutional" as indicating that the demonstration operation will commence, in this illustrative embodiment one or more processors of the conferencing system terminal device 101 use one or more sensors to detect the hand 501 of participant 107 entering a field of view of an image capture device 504 capturing one or more images of participant 107. The hand 501 is further holding a demonstration object 502 having text thereon, which in this illustrative embodiment is the US Constitution.

When this occurs, i.e., when one or more sensors of the conferencing system terminal device 101 detect the initiation of the demonstration operation employing the demonstration object 502 occurring in the environment of the conferencing system terminal device 101, the one or more processors of the conferencing system terminal device 101 transition from the normal videoconference mode of operation to the demonstration operation and preclude application of the mf to the one or more images 503 being captured by the image capture device 504 of the conferencing system terminal device 101. When those images are presented on the content presentation companion device 113, the text of the Constitution runs from left to right rather than right to left. Thus, when viewed by participant 107, he has no trouble at all pointing to Article I, Section 9, which states that no Bill of Attainder or ex post facto Law shall be passed.

Participant 107 then declares the assignment of his new task to be nothing more than a thinly veiled Bill of Attainder and declares the entire proceeding to be both unconstitutional and a violation of his individual rights. As shown by the reaction of participant 109, everyone has a good laugh in response.

Participant 107 discovers that, by using an electronic device configured in accordance with embodiments of the disclosure, he is able to quickly identify and point to content on the Constitution in a smooth, calm, confident, and polished manner. There is no need to "read backwards" or think "left is right, and right is left," as the images depicting the participant 107 being presented on the content presentation companion device 113 show Section Nine, as well as Section Ten stating no State shall pass any Bill of Attainder, provide the text in an easily readable manner.

Unfortunately, this does not prevent participant 107 from having to do the newly assigned task. Participant 107 therefore begins to contemplate life as a standup comic, reveling in the fact that he will be able to perform his standup routine using such historical documents as props, and without having to "think backwards" to point to various sections, thanks to embodiments of this very disclosure and their ability to present demonstration objects in a legible manner by precluding the application of a mirroring function when a demonstration operation is detected. Accordingly, armed with a conferencing system terminal device 101 equipped with embodiments of the disclosure, a new star is born. Participant 107 immediately quits his job and takes his legal comedy shenanigans on the road.

Figure 6:
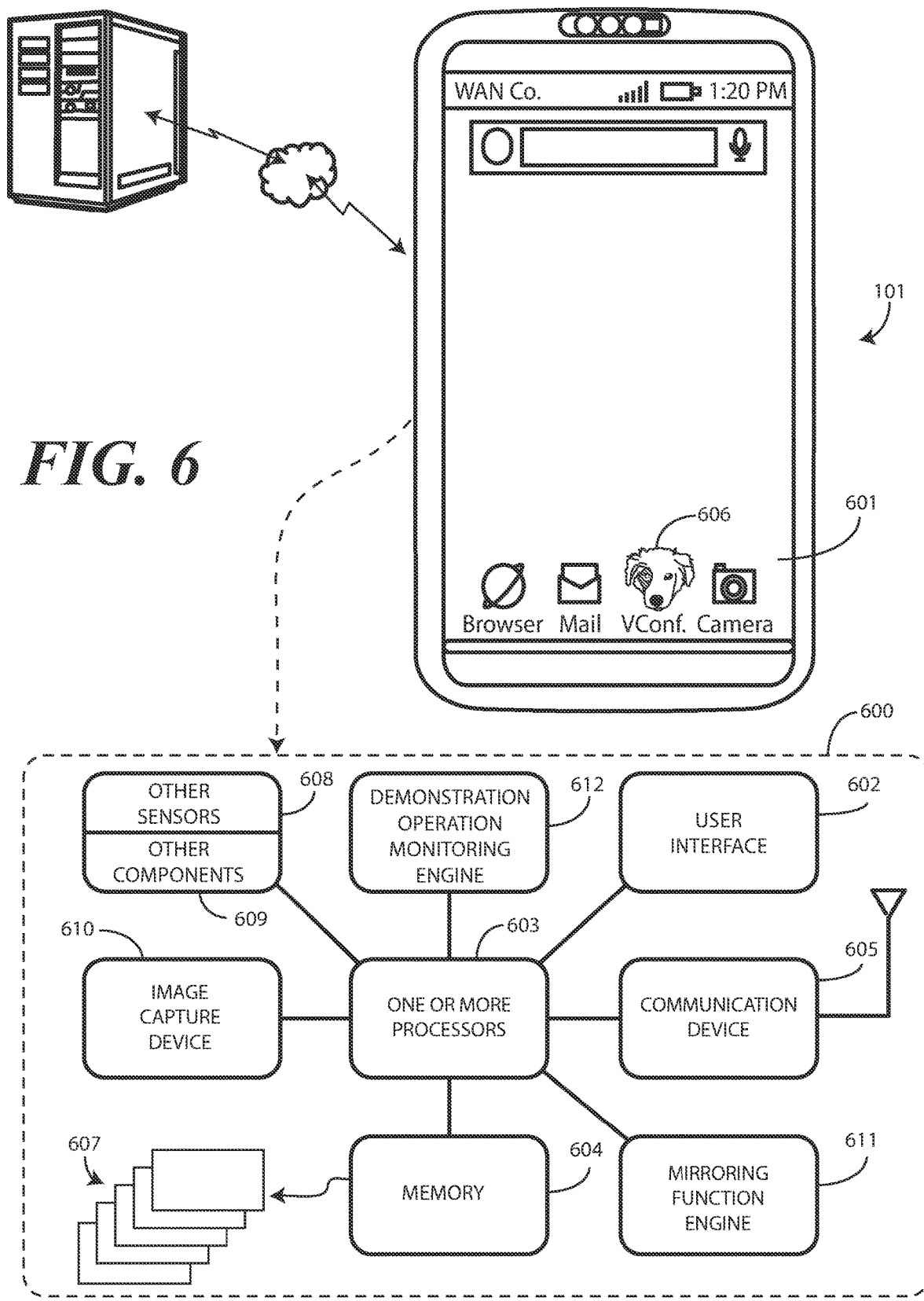
FIG. 6 illustrates one explanatory electronic device in accordance with one or more embodiments of the disclosure.

Turning now to FIG. 6, illustrated therein is one explanatory conferencing system terminal device 101 configured in accordance with one or more embodiments of the disclosure. The conferencing system terminal device 101 of FIG. 6 is a portable electronic device. For illustrative purposes, the conferencing system terminal device 101 is shown as a smartphone. However, the conferencing system terminal device 101 could be any number of other devices as well, including tablet computers, desktop computers, notebook computers, and so forth. Still other types of conferencing system terminal devices can be configured in accordance with one or more embodiments of the disclosure as will be readily appreciated by those of ordinary skill in the art having the benefit of this disclosure.

This illustrative conferencing system terminal device 101 includes a display 601, which may optionally be touch sensitive. In one embodiment where the display 601 is touch-sensitive, the display 601 can serve as a primary user interface 602 of the conferencing system terminal device 101. Users can deliver user input to the display 601 of such an embodiment by delivering touch input from a finger, stylus, or other objects disposed proximately with the display 601.

In one embodiment, the display 601 is configured as an active-matrix organic light emitting diode (AMOLED) display. However, it should be noted that other types of displays, including liquid crystal displays, would be obvious to those of ordinary skill in the art having the benefit of this disclosure. Where the conferencing system terminal device 101 is configured with a keyboard and/or mouse, such as when the conferencing system terminal device 101 is configured as a computer, the keyboard and/or mouse can serve as the primary user interface 602.

A block diagram schematic 600 of the conferencing system terminal device 101 is also shown in FIG. 6. The block diagram schematic 600 can be configured as a printed circuit board assembly disposed within the device housing of the conferencing system terminal device 101. Various components can be electrically coupled together by conductors, or a bus disposed along one or more printed circuit boards.

In one or more embodiments, the conferencing system terminal device 101 includes one or more processors 603. In one embodiment, the one or more processors 603 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the conferencing system terminal device 101. Each of the application processor and the auxiliary processor(s) can be configured to process and execute executable software code to perform the various functions of the conferencing system terminal device 101. A storage device, such as memory 604, can optionally store the executable software code used by the one or more processors 603 during operation.

The conferencing system terminal device 101 also includes a communication device 605 that can be configured for wired or wireless communication with one or more other devices or networks. The networks can include a wide area network, a local area network, and/or personal area network. The communication device 605 may also utilize wireless technology for communication, such as, but are not limited to, peer-to-peer or ad hoc communications such as HomeRF, Bluetooth and IEEE 802.11, and other forms of wireless communication such as infrared technology. The communication device 605 can include wireless communication circuitry, one of a receiver, a transmitter, or transceiver, and one or more antennas.

In one embodiment, the one or more processors 603 can be responsible for performing the primary functions of the conferencing system terminal device 101. For example, in one embodiment the one or more processors 603 comprise one or more circuits operable with one or more user interface devices, which can include the display 601, to engage in videoconferences by transmitting, receiving, and presenting images, video, or other presentation information. The executable software code used by the one or more processors 603, including that associated with a videoconference application 606, can be configured as one or more modules 607 that are operable with the one or more processors 603. Such modules 607 can store instructions, control algorithms, logic steps, and so forth.

In one embodiment, the one or more processors 603 are responsible for running the operating system environment of the conferencing system terminal device 101. The operating system environment can include a kernel and one or more drivers, and an application service layer, and an application layer. The operating system environment can be configured as executable code operating on one or more processors or control circuits of the conferencing system terminal device 101. The application layer can be responsible for executing application service modules. The application service modules may support one or more applications or "apps," such as the videoconference application 606. The applications of the application layer can be configured as clients of the application service layer to communicate with services through application program interfaces (APIs), messages, events, or other inter-process communication interfaces.

Where auxiliary processors are used, they can be used to execute input/output functions, actuate user feedback devices, and so forth.

In one embodiment, the one or more processors 603 may generate commands or execute control operations based upon user input received at the user interface 602. Moreover, the one or more processors 603 may process the received information alone or in combination with other data, such as the information stored in the memory 604.

The conferencing system terminal device 101 can include one or more sensors 608. The one or more sensors 608 may include a microphone, an earpiece speaker, and/or a second loudspeaker. The one or more other sensors 608 may also include touch actuator selection sensors, proximity sensors, a touch pad sensor, a touch screen sensor, a capacitive touch sensor, and one or more switches. Touch sensors may used to indicate whether any of the user actuation targets present on the display 601, including the audio difficulties user actuation targets described above, are being actuated. The other sensors 608 can also include audio sensors and video sensors (such as a camera).

Other components 609 operable with the one or more processors 603 can include output components such as video outputs, audio outputs, and/or mechanical outputs. Examples of output components include audio outputs such as speaker port, earpiece speaker, or other alarms and/or buzzers and/or a mechanical output component such as vibrating or motion-based mechanisms. Still other components will be obvious to those of ordinary skill in the art having the benefit of this disclosure.

The other components 609 can also include an audio input/processor. The audio input/processor can include hardware, executable code, and speech monitor executable code in one embodiment. The audio input/processor can include, stored in memory 604, basic speech models, trained speech models, or other modules that are used by the audio input/processor to receive and identify voice commands that are received with audio input captured by an audio input/processor, one example of which is a microphone of the one or more sensors 608. In one embodiment, the audio input/processor can include a voice recognition engine. Regardless of the specific implementation utilized in the various embodiments, the audio input/processor can access various speech models to identify speech commands in one or more embodiments.

To capture video during a videoconference, in one or more embodiments the conferencing system terminal device 101 includes an imager 610 or another image capture device (504). The conferencing system terminal device 101 can optionally include a depth imager as well.

In one embodiment, the imager 610 comprises a two-dimensional imager configured to receive at least one image of a person within an environment of the conferencing system terminal device 101. In one embodiment, the imager 610 comprises a two-dimensional RGB imager. In another embodiment, the imager 610 comprises an infrared imager. Other types of imagers suitable for use as the imager 610 of the conferencing system terminal device 101 will be obvious to those of ordinary skill in the art having the benefit of this disclosure.

In one or more embodiments, the conferencing system terminal device 101 includes a mirroring function engine 611. The conferencing system terminal device 101 can also include a demonstration operation monitoring engine 612. In one or more embodiments, the mirroring function engine 611 and/or demonstration operation monitoring engine 612 is operable with the one or more processors 603. In some embodiments, the one or more processors 603 can control the mirroring function engine 611 and/or demonstration operation monitoring engine 612. In other embodiments, the mirroring function engine 611 and/or demonstration operation monitoring engine 612 can operate independently, sensing contextual information from the one or more sensors 608 and/or receiving or identifying contextual information from remote servers and electronic devices using the communication device 605 to the one or more processors 603. The mirroring function engine 611 and/or demonstration operation monitoring engine 612 can receive data from the various sensors 608. In one or more embodiments, the one or more processors 603 are configured to perform the operations of the mirroring function engine 611 and/or demonstration operation monitoring engine 612.

In one or more embodiments, the mirroring function engine 611 operates in one of two modes. In a normal videoconference mode of operation, the mirroring function engine 611 applies a mirroring function to one or more images capture by the imager 610 from an environment of the conferencing system terminal device 101 and delivers the mirrored images to the communication device 605 for delivery to, and presentation, a content presentation companion device. However, in response to the demonstration operation monitoring engine 612 detecting the initiation of a demonstration operation, the mirroring function engine 611 transitions from the normal videoconference mode of operation to a demonstration operation and precludes application of the mirroring function to the one or more images captured by the imager 610 from the environment of the conferencing system terminal device 101 that are being delivered to the communication device 605 for presentation on the content presentation companion device In one or more embodiments, the mirroring function engine 611 automatically applies the mirroring function when operating in the normal videoconference mode of operation only to images that are to be presented locally on a content presentation companion device or on the display 601 of the conferencing system terminal device 101. When the images are transmitted to remote conferencing system terminal devices engaged in a videoconference, no mirroring function is applied. Thus, in one or more embodiments no mirroring function is applied to images transmitted to other conferencing system terminal devices participating in the videoconference.

The mirroring function engine 611 and/or demonstration operation monitoring engine 612 can be operable with the various sensors 608 to detect, infer, capture, and otherwise determine persons, actions, demonstration operations, and other contextual information that are occurring in an environment about the conferencing system terminal device 101. For example, where included one embodiment of the mirroring function engine 611 and/or demonstration operation monitoring engine 612 determines that a demonstration operation is occurring based upon assessed contexts and frameworks using adjustable algorithms of context assessment employing information, data, and events. These assessments may be learned through repetitive data analysis. These assessments can be used to obtain additional contextual information when the contextual information changes in one or more embodiments. The mirroring function engine 611 and/or demonstration operation monitoring engine 612 can comprise an artificial neural network or other similar technology in one or more embodiments.

In one or more embodiments, the demonstration operation monitoring engine 612 is operable to detect the initiation of a demonstration operation for one or more videoconference feeds received from one or more conferencing system terminal devices. Thereafter, the mirroring function engine 611 can preclude the application of the mirroring function in response to the demonstration operation monitoring engine 612 detecting initiation of a demonstration operation. The communication device 605 can then deliver one or more images—absent the mirroring function—to a conferencing system terminal device for presentation to the person performing the demonstration operation.

In one or more embodiments, the demonstration operation monitoring engine 612 detects the initiation of the demonstration operation from audio associated with the one or more videoconference feeds. In other embodiments, the demonstration operation monitoring engine 612 detects the initiation of the demonstration operation by detecting depictions of a hand holding the demonstration object in the one or more videoconference feeds. In still other embodiments, the demonstration operation monitoring engine 612 detects the initiation of the demonstration operation from user input received at the user interface 602 that identifies the demonstration object.

In one or more embodiments, the one or more processors 603 and/or demonstration operation monitoring engine 612 can present, at the user interface 602 of the conferencing system terminal device 101, images captured by the imager 610 without any mirroring function being applied. This allows a user of the conferencing system terminal device 101 to select a demonstration object. When the one or more processors 603 receive a user selection identifying the demonstration object at the user interface from the images without the mirroring function, the one or more processors 603 deliver the same to the communication device 605 for presentation on a content presentation companion device. The demonstration operation monitoring engine 612 can also detect the initiation of a demonstration operation from text-based correspondence occurring in a videoconference when that text-based correspondence indicates commencement of the demonstration operation as well.

It is to be understood that FIG. 6 is provided for illustrative purposes only and for illustrating components of one conferencing system terminal device 101 in accordance with embodiments of the disclosure and is not intended to be a complete schematic diagram of the various components required for an electronic device. Therefore, other conferencing system terminal devices in accordance with embodiments of the disclosure may include various other components not shown in FIG. 6 or may include a combination of two or more components or a division of a particular component into two or more separate components, and still be within the scope of the present disclosure.

Figure 7:
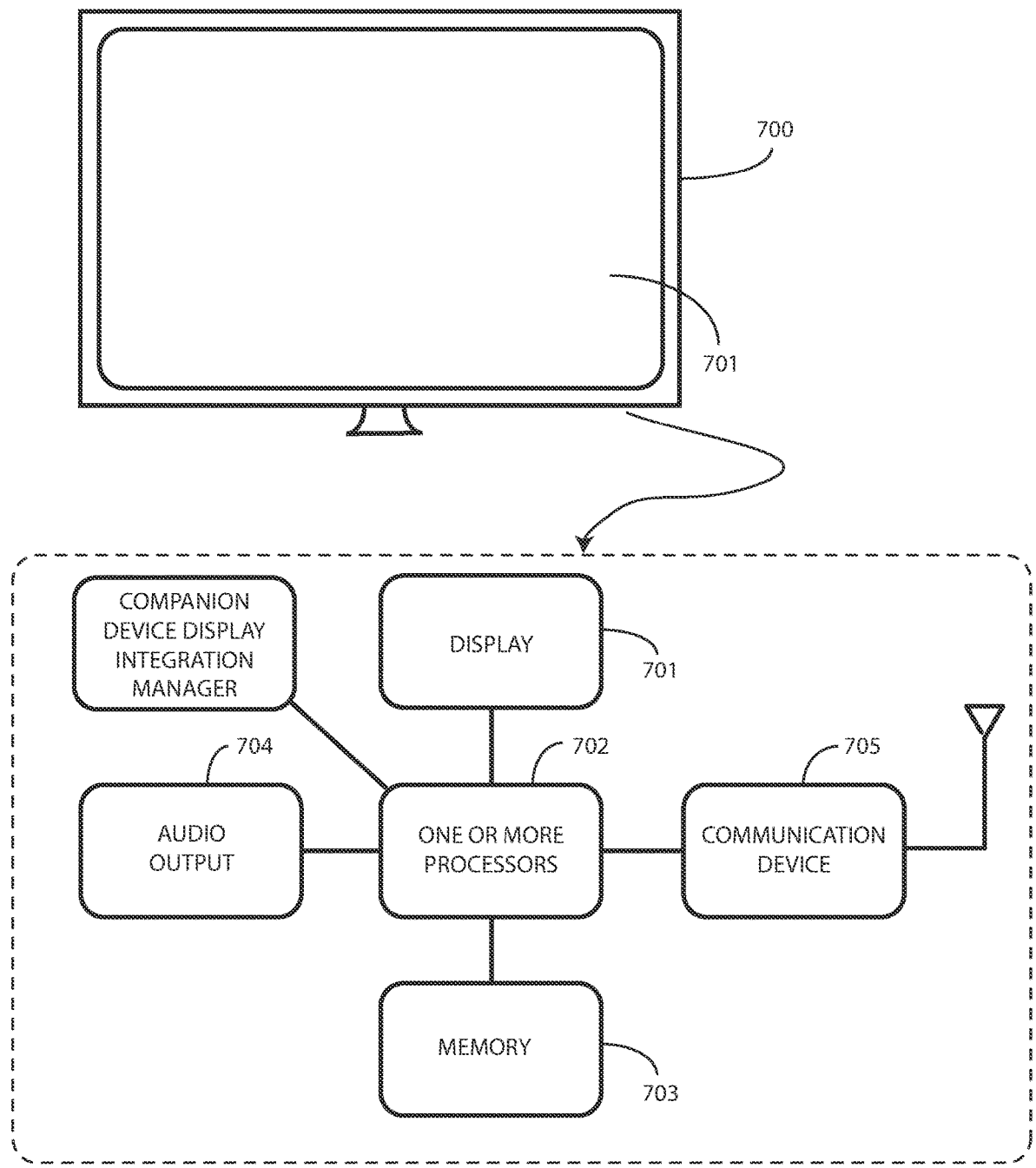
FIG. 7 illustrates one explanatory content presentation companion device in accordance with one or more embodiments of the disclosure.

Embodiments of the disclosure contemplate that conferencing system terminal devices used in videoconferencing applications can be operable with companion devices in a "ready for" environment. Illustrating by example, a conferencing system terminal device can include a companion device display integration manager. The companion device display integration manager can be used to communicate with a companion electronic device, one example of which is a content presentation companion device. Turning now to FIG. 7, illustrated therein is one such content presentation companion device 700.

In this illustrative embodiment, the content presentation companion device 700 comprises a color video monitor. In other embodiments, the content presentation companion device 700 can take other forms. Illustrating by example, the content presentation companion device 700 can be a television, a computer display, a laptop display, a tablet computer, or a projector projecting content onto a screen. Other examples of content presentation companion devices 700 will be obvious to those of ordinary skill in the art having the benefit of this disclosure. Regardless of configuration, in one or more embodiments the content presentation companion device 700 includes one or more processors 702, a display 701, a memory 703, an audio output 704, and a communication device 705 capable of wired or wireless communication with an electronic device such as the conferencing system terminal device (101) of FIG. 6.

In one or more embodiments, when coupled by a wireless connection to such a conferencing system terminal device (101), the content presentation companion device 700 can function as an auxiliary display for the conferencing system terminal device (101). The conferencing system terminal device (101) can receive content, one example of which includes one or more videoconference feeds, from a terrestrial broadcast network, cable television network, videoconference server, Internet streaming service, or combinations thereof, and redirect this content to the content presentation companion device 700 (using its companion device display integration manager) since its display 701 is larger than the display (601) of the conferencing system terminal device (101). In one or more embodiments, content flows from the conferencing system terminal device (101) to the content presentation companion device 700 through the communication device 705.

Turning now to FIGS. 8-9, illustrated therein is another conferencing system terminal device 800 configured in accordance with one or more embodiments of the disclosure. To this point, the electronic devices functioning as conferencing system terminal devices described above have had rigid device housings that maintain a single geometric form factor. However, embodiments of the disclosure contemplate that conferencing system terminal devices can be deformable as well. When configured as deformable devices, the geometric form factor of the conferencing system terminal device can affect the operation of the mirroring function engine (611) when operating in the normal videoconference mode of operation. Specifically, in one or more embodiments the mirroring function engine (611) applies the mirroring function only to images captured by an image capture device facing a subject. This "front facing" image capture device creates images depicting the user and will have the mirroring function applied in the normal videoconference mode of operation. However, "rear facing" image capture devices would not have the mirroring function applied. Accordingly, when they are presented on a content presentation companion device, they depict what the user of the conferencing system terminal device sees.

Accordingly, the image capture device oriented toward the subject can change between a deformed and undeformed state. To illustrate by a simple example, pivoting a first device housing relative to a second device housing about a hinge from a closed position to an axially displaced open position may cause a first image capture device, initially oriented toward the subject, to now be inverted and directed away from the subject, while a second image capture device, which was initially concealed, is no revealed and oriented toward the subject.

The conference system terminal device 800 of FIGS. 8 and 9 includes a first device housing 802 and a second device housing 803. In one or more embodiments, a hinge 801 couples the first device housing 802 to the second device housing 803. In one or more embodiments, the first device housing 802 is selectively pivotable about the hinge 801 relative to the second device housing 803. For example, in one or more embodiments the first device housing 802 is selectively pivotable about the hinge 801 between a closed position, shown and described below with reference to FIG. 10, a partially open position, shown and described below with reference to FIG. 11, and an open position, shown and described below with reference to FIG. 12.

In one or more embodiments the first device housing 802 and the second device housing 803 are manufactured from a rigid material such as a rigid thermoplastic, metal, or composite material, although other materials can be used. Still other constructs will be obvious to those of ordinary skill in the art having the benefit of this disclosure. In the illustrative embodiment of FIGS. 8-9, the conference system terminal device 800 includes a single hinge 801. However, in other embodiments two or more hinges can be incorporated into the conference system terminal device 800 to allow it to be folded in multiple locations.

While the illustrative conference system terminal device 800 of FIGS. 8-9 includes a hinge 801, embodiments of the disclosure are not so limited. In other embodiments, the conference system terminal device 800 will be bendable, but will not include a hinge 801, such as when the first device housing 802 and the second device housing 803 are a first device housing portion and a second device housing portion linked by a deformable portion of a single device housing manufactured from bendable materials. In still other embodiments, the conference system terminal device 800 can be bendable via a combination of hinge components and non-hinge components.

Illustrating by example, in another embodiment the conference system terminal device 800 of FIGS. 8-9 includes a single housing that is flexible. In one embodiment, the housing may be manufactured from a malleable, bendable, or physically deformable material such as a flexible thermoplastic, flexible composite material, flexible fiber material, flexible metal, organic or inorganic textile or polymer material, or other materials. The housing could be formed from a single flexible housing member or from multiple flexible housing members.

In other embodiments, the housing could be a composite of multiple components. For instance, in another embodiment the housing could be a combination of rigid segments connected by hinges or flexible materials. Still other constructs will be obvious to those of ordinary skill in the art having the benefit of this disclosure.

The illustrative conference system terminal device 800 of FIGS. 8-9 includes multiple displays. A first display 804, also referred to as the interior display or the front-facing display, is concealed when the first device housing 802 is pivoted about the hinge 801 relative to the second device housing 803 to a closed position. For example, the first display 804 is concealed in FIG. 10 below. This first display 804 is then revealed when the first device housing 802 is pivoted about the hinge 801 relative to the second device housing 803 from the closed position to an axially displaced open position. Thus, the first display 804 is revealed as the conference system terminal device 800 transitions from the closed position of FIG. 10 to the open position of FIG. 12.

In one or more embodiments, the conference system terminal device 800 also includes at least a second display 805. In the illustrative embodiment of FIGS. 8-9, the second display 805 can be referred to as an exterior display or rear-facing display, as the second display 805 is exposed both when the first device housing 802 and the second device housing 803 are pivoted about the hinge 801 to the closed position or the axially displaced open position. Thus, the second display 805 is exposed both in the axially displaced open position of FIG. 9 and the closed position of FIG. 10. In one or more embodiments, each of the first display 804 and the second display 805 is a high-resolution display.

While shown coupled to the first device housing 802, it should be noted that the second display 805 could be coupled to either of the first device housing 802 or the second device housing 803. In other embodiments, the second display 805 can be coupled to the first device housing 802, while a third display (not shown) is coupled to the second device housing 803. Thus, electronic devices configured in accordance with embodiments of the disclosure can include displays situated at different positions.

As with the second display 805, the first display 804 can also be coupled to either or both of the first device housing 802 or the second device housing 803. In this illustrative embodiment, the first display 804 is coupled to both the first device housing 802 and the second device housing 803 and spans the hinge 801. In other embodiments, the "first" display can be two displays, with one coupled to the first device housing 802 and another coupled to the second device housing 803. In either case, this first display 804 is considered to be an "interior" display because it is concealed when the first device housing 802 and the second device housing 803 are in the closed position.

In one or more embodiments, either or both of first display 804 and second display 805 can be touch sensitive. Where this is the case, users can deliver user input to one or both of the first display 804 or the second display 805 by delivering touch input from a finger, stylus, or other objects disposed proximately with the first display 804 or the second display 805.

In the illustrative embodiment of FIGS. 8-9, since the first display 804 spans the hinge 801, it is configured to be flexible. For instance, in one embodiment the first display 804 is configured as an organic light emitting diode (OLED) display fabricated on a flexible plastic substrate. This allows the first display 804 to be flexible so as to deform when the first device housing 802 pivots about the hinge 801 relative to the second device housing 803. However, it should be noted that other types of displays would be obvious to those of ordinary skill in the art having the benefit of this disclosure. In other embodiments conventional, rigid displays can be disposed to either side of the hinge rather than using a flexible display.

In one or more embodiments, the first display 804 is configured as an OLED constructed on flexible plastic substrates to allow the first display 804 to bend in accordance with various bending radii. For example, some embodiments allow bending radii of between thirty and six hundred millimeters to provide a bendable display. Other substrates allow bending radii of around five millimeters to provide a display that is foldable through active bending. Other displays can be configured to accommodate both bends and folds. In one or more embodiments the first display 804 may be formed from multiple layers of flexible material such as flexible sheets of polymer or other materials.

In this illustrative embodiment, the first display 804 is coupled to the first device housing 802 and the second device housing 803. Accordingly, the first display 804 spans the hinge 801 in this embodiment. In one or more embodiments, the first display 804 can instead be coupled to one, or two, spring-loaded, slidable trays that situate within one or both of the first device housing 802 and the second device housing 803. The use of one or two slidable trays advantageously allows the first display 804 to be placed in tension when the conference system terminal device 800 is in the open position. This causes the first display 804 to be flat, rather than wavy due to mechanical memory effects, when the conference system terminal device 800 is in the open position.

Features can be incorporated into the first device housing 802 and/or the second device housing 803. Examples of such features include image capture device 906, which in this embodiment is an exterior or rear-facing imager. The image capture device 906, which can be any number of types of image capture devices, has its lens situated such that it is directed away from a user who is holding the conference system terminal device 800 and facing the second display 805. This allows the image capture device 906 to receive light directed toward the conference system terminal device 800 from a location in front of the user when the user is holding the conference system terminal device 800 and facing the first display 804.

In addition to the image capture device 906, a second, front-facing image capture device 806 can be positioned on the interior side of the conference system terminal device 800 to receive light and images directed toward the first display 804. When a user is holding the conference system terminal device 800 and looking at the first display 804, this second, front-facing image capture device 806 can be used to take a selfie without turning the conference system terminal device 800 around. While two imagers are shown in the illustrative embodiment of FIGS. 8-9, it should be noted that embodiments of the disclosure can include additional imagers mounted in different positions that can be actuated to capture images from different angles.

Other examples of features that can be incorporated into the first device housing 802 and/or the second device housing 803 include an optional speaker port 901. While shown situated on the exterior of the conference system terminal device 800 in FIG. 9, the optional speaker port 901 could also be placed on the interior side as well. In this illustrative embodiment, a user interface component 902, which may be a button or touch sensitive surface, can also be disposed along the exterior side of the second device housing 803. As noted, any of these features shown being disposed on the exterior side of the conference system terminal device 800 could be located elsewhere, such as on the interior side or mirror sides in other embodiments.

A block diagram schematic of the conference system terminal device 800 would include one or more of the components illustrated and described above with reference to the block diagram schematic of FIG. 6, including the mirroring function engine (611) and/or the demonstration operation monitoring engine (612). Since these components have already been described, they will not be again described here in the interest of brevity.

However, additional components that the conference system terminal device 800 of FIGS. 8 and 9 may include that the conferencing system terminal device (101) of FIG. 6 did not include one or more flex sensors that detect a bending operation that causes the first device housing 802 to pivot about the hinge 801 relative to the second device housing 803, thereby transforming the conference system terminal device 800 into a deformed geometry, such as that shown in FIGS. 10-11. The inclusion of flex sensors is optional, and in some embodiment flex sensors will not be included.

In one embodiment, the flex sensors comprise passive resistive devices manufactured from a material with an impedance that changes when the material is bent, deformed, or flexed. By detecting changes in the impedance as a function of resistance, the one or more processors of the conference system terminal device 800 can use the one or more flex sensors to detect bending of the first device housing 802 about the hinge 801 relative to the second device housing 803.

In one or more embodiments, each flex sensor comprises a bi-directional flex sensor that can detect flexing or bending in two directions. In one embodiment, the one or more flex sensors have an impedance that increases in an amount that is proportional with the amount it is deformed or bent.

In one embodiment, each flex sensor is manufactured from a series of layers combined together in a stacked structure. In one embodiment, at least one layer is conductive, and is manufactured from a metal foil such as copper. A resistive material provides another layer. These layers can be adhesively coupled together in one or more embodiments. The resistive material can be manufactured from a variety of partially conductive materials, including paper-based materials, plastic-based materials, metallic materials, and textile-based materials. In one embodiment, a thermoplastic such as polyethylene can be impregnated with carbon or metal so as to be partially conductive, while at the same time being flexible.

In one embodiment, the resistive layer is sandwiched between two conductive layers. Electrical current flows into one conductive layer, through the resistive layer, and out of the other conductive layer. As the flex sensor bends, the impedance of the resistive layer changes, thereby altering the flow of current for a given voltage. The one or more processors of the conference system terminal device 800 can detect this change to determine an amount of bending. Taps can be added along each flex sensor to determine other information, including the amount of bending, the direction of bending, and so forth. The flex sensor can further be driven by time-varying signals to increase the amount of information obtained from the flex sensor as well. While a multi-layered device as a flex sensor is one configuration suitable for detecting at least a bending operation occurring to deform the conference system terminal device 800 and a geometry of the conference system terminal device 800 after the bending operation, others can be used as well. Additionally, other types of flex sensors will be obvious to those of ordinary skill in the art having the benefit of this disclosure.

Turning now to FIG. 10, illustrated therein is the conference system terminal device 800 in a closed state. In this state, the first device housing 802 has been pivoted about the hinge 801 toward the second device housing 803 to a closed position 1000. When in the closed position 1000, a front surface of the first device housing 802 abuts a front surface of the second device housing 803. When in the closed position 1000, the exterior display, i.e., second display 805, and the exterior image capture device 906 are visible, exposed, and accessible by a user. By contrast, when in the closed position 1000, the interior display, i.e., first display (804), and the second image capture device (806) are concealed, are not visible, and are inaccessible by a user. Effectively, in the closed position 1000 the first device housing 802 and the second device housing 803 are analogous to clam shells that have been shut by the claim, thereby giving rise to the "clamshell" style of device.

Turning now to FIG. 11, the conference system terminal device 800 is shown being transitioned from the closed position (1000) of FIG. 10 to a partially opened position 1100. Specifically, the first device housing 802 is pivoting about the hinge 801 away from the second device housing 803 toward, but not fully yet to, an open position where the first device housing 802 is axially displaced about the hinge 801 from the second device housing 803. The position shown in FIG. 11 can be referred to as a "tent position."

Turning now to FIG. 12, illustrated therein is the conference system terminal device 800 in an open position 1200 where the first device housing 802 is rotated about the hinge 801 so as to become axially displaced from the second device housing 803. In the open position, the first device housing 802 is rotated about the hinge 801 180-degrees out of phase with the second device housing 803 such that the first device housing 802 and the second device housing 803 effectively define a plane. The first display 804, being flexible, has been transitioned from a bent position into the elongated flat position show in FIG. 12. In one or more embodiments this occurs due to the action of one or more slidable trays (mentioned above), which can be disposed within one or both of the first device housing 802 and the second device housing 803.

As noted above with reference to FIG. 3, since the conference system terminal device 800 is deformable between an axially displaced open position and a closed position, the geometric form factor can become a factor in determining whether, for example, the first image capture device (906) or the second image capture device 806 is oriented toward a subject. Since the conference system terminal device 800 includes two image capture devices, during a video conference it is important to know within which field of view a subject is positioned. If positioned within the field of view of the second image capture device 806, the one or more processors of the conferencing system terminal device 800 would apply the mirroring function to images captured by the second image capture device 806 when in the normal videoconference mode of operation, while precluding the application of the mirroring function to the images captured by the first image capture device (906). Accordingly, to determine which image capture device is capturing images of a subject, one or more processors of the conference system terminal device 800 may initially determine within which field of view a subject is situated.

Figure 13:
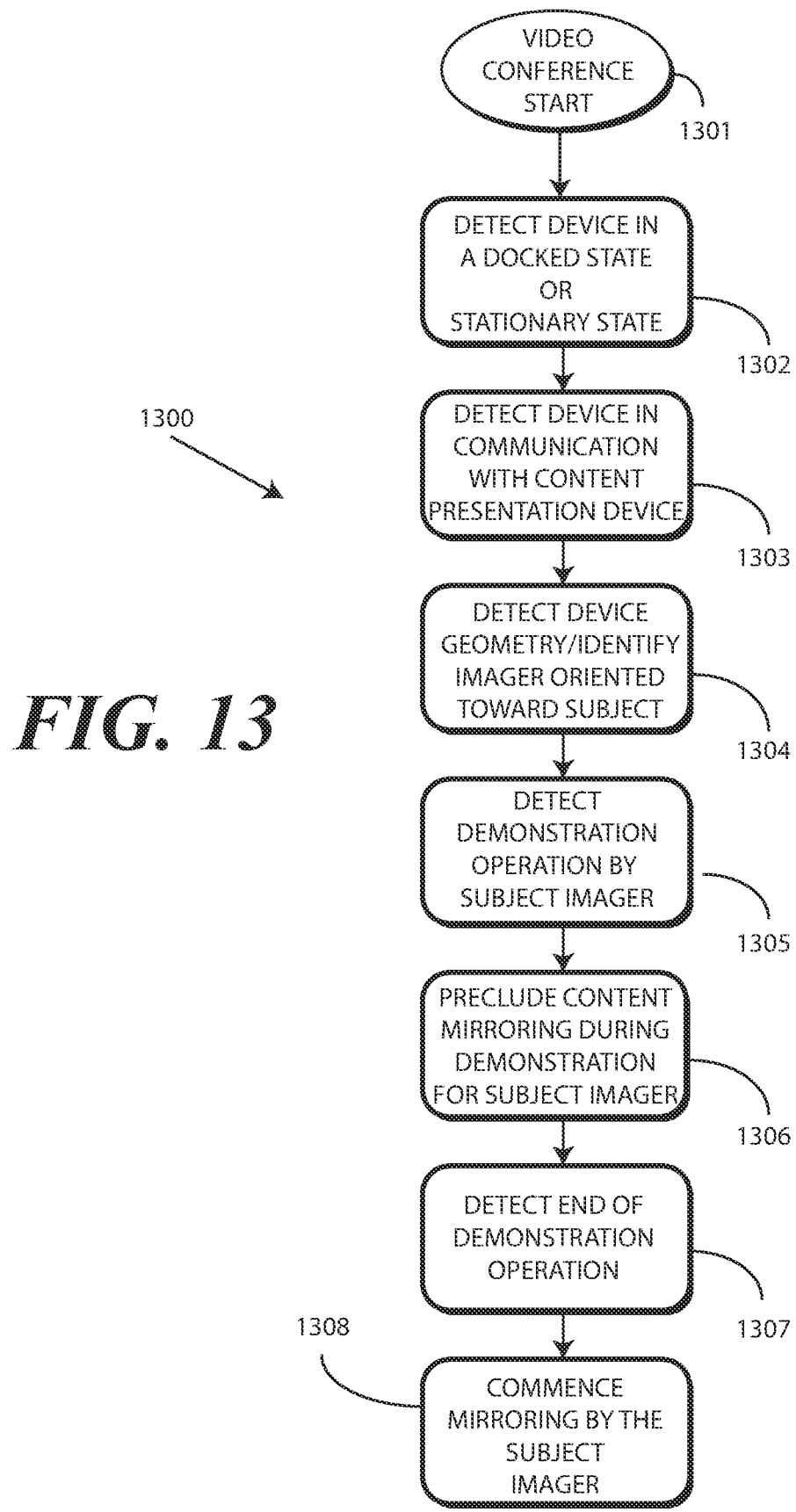
FIG. 13 illustrates another explanatory method in accordance with one or more embodiments of the disclosure.

Turning now to FIG. 13, illustrated therein is one explanatory method 1300 for using a conferencing system terminal device that is deformable, such as that shown and described in FIGS. 8-12 above.

Beginning at stage 1301, a videoconference is initiated. In one or more embodiments, the videoconference occurs across a network. In one or more embodiments, the videoconference includes one or more videoconference feeds associated therewith. These videoconference feeds can include audio content and/or video content. In one or more embodiments, the conferencing system terminal device engaged in the videoconference occurring at stage 1301 includes an image capture device capturing images of a subject during the videoconference occurring across a network. A communication device transmits the images to at least one remote electronic device engaged in the videoconference at stage 1301. In one or more embodiments, the images transmitted to the at least one remote electronic device engaged in the videoconference have no mirroring function applied thereto.

At step 1302, one or more sensors of a conferencing system terminal device optionally detect whether the conferencing system terminal device is in a stationary or docked condition. When the conferencing system terminal device is being used as a webcam for a content presentation companion device, it will frequently be still—either by sitting on a desk or by being placed in a docking station. Accordingly, in one or more embodiments step 1302 first determines, with one or more sensors of the conferencing system terminal device, whether the conferencing system terminal device is in a docked or stationary condition.

At step 1303, one or more processors of the conferencing system terminal device determine that a communication device of the conferencing system terminal device is in communication with the content presentation companion device while (1) the content presentation companion device is being used as a primary display for the conferencing system terminal device and (2) while the one or more images are being captured by the image capture device of the conferencing system terminal device.

Step 1303 can also comprise determining that a videoconference participant is actively engaged in a videoconference with their outgoing video feed turned ON. In one or more embodiments, one or more processors of the conferencing system terminal device operate in a normal videoconference mode of operation at step 403 where a mirroring function is applied to one or more images being captured by a local image capture device and presented to a participant on a display of the conferencing system terminal device.

At step 1304, the method 1300 determines a geometric form factor of the conferencing system terminal device and/or a geometric orientation of the conferencing system terminal device in three-dimensional space. If the conferencing system terminal device is in an axially displaced open position and docked, a different image capture device will be oriented toward a subject than when the conferencing system terminal device is in the closed position and similarly docked. Accordingly, to determine which image capture device is oriented toward a subject, i.e., to which images a mirroring function will be applied when the conferencing system terminal device is operating in the normal videoconference mode of operation, step 1304 can comprise determining the geometric form factor and/or geometric orientation of the conferencing system terminal device in three-dimensional space.

In one or more embodiments, step 1304 comprises selecting an image capture device from at least a first image capture device and a second image capture device that is oriented toward a subject so that the mirroring function can be applied to images captured by the selected image capture device when the conferencing system terminal device is operating in a normal videoconference mode of operation. In one or more embodiments, this selection occurs as a function of one or both of the geometric form factor and/or the geometric orientation of the conferencing system terminal device in three-dimensional space. Step 1304 can also comprise causing the selected image capture device that is oriented toward the subject to capture one or more images for presentation on a content presentation companion device during a videoconference and applying a mirroring function to the one or more images when operating in the normal videoconference mode of operation.

At step 1305, one or more sensors and/or a demonstration operation monitoring engine of the conferencing system terminal device detect initiation of a demonstration operation by a participant. Said differently, at step 1305 the method 1300 then detects a demonstration operation commencing. This can occur in a variety of ways, including any of the ways described above with reference to FIG. 4.

In one or more embodiments, in response to the one or more sensors detecting initiation of a demonstration operation by the subject at step 1305, at step 1306 the one or more processors transition from the normal videoconference mode of operation to a demonstration videoconference mode of operation. When operating in the demonstration videoconference mode of operation, the one or more processors of the conferencing system terminal device preclude the application of a mirroring function to images being captured by a local image capture device of the conferencing system terminal device. In one or more embodiments, where the demonstration operation is an object with text, the preclusion of the mirroring function at step 1306 results in depictions of the text from the one or more images of the subject on the content presentation companion device running from a left side of the content presentation companion device toward a right side of the content presentation companion device. In one or more embodiments, the demonstration videoconference mode of operation of step 1306 occurs only when the demonstration object includes text.

As noted above in the description of step 1302, in one or more embodiments a docked operating condition or a substantially stationary condition or a perfectly stationary condition of the electronic device is a prerequisite for step 1306 to occur. Accordingly, where optional step 1302 is included, in one or more embodiments step 1306 transitions to the demonstration videoconference mode of operation and precludes the application of the mirroring function in response to the detection of a demonstration operation detected at step 1305 is only when the conferencing system terminal device is substantially stationary, perfectly stationary, or docked.

At step 1307, the method 1300 detects a cessation of the demonstration operation. At step 1307, the method 1300 transitions from the demonstration videoconference mode of operation to the normal videoconference mode of operation and again applies the mirroring function to one or more images being captured by the image capture device of the conferencing system terminal device selected as a function of the geometric form factor and/or geometric orientation in three-dimensional space as being oriented toward a subject. Other images captured by other image capture device do not have the mirroring function applied thereto. At step 1308, the method 1300 can repeat as additional demonstration operations or demonstration objects are detected.

It should be noted that in one or more embodiments, the mirroring function is applied at step 1303, and precluded at step 1306, to only locally captured images. In one or more embodiments the mirroring function is applied at step 1303, and precluded at step 1306, to one or more images of a subject when those one or more images are viewed by the subject. Thus, the subject only sees a mirrored image when the mirroring function is applied. The communication device of the conferencing system terminal device transmits the one or more images of the subject to at least one remote electronic device engaged in the videoconference without the mirroring function applied to the one or more images of the subject.

Figure 14:
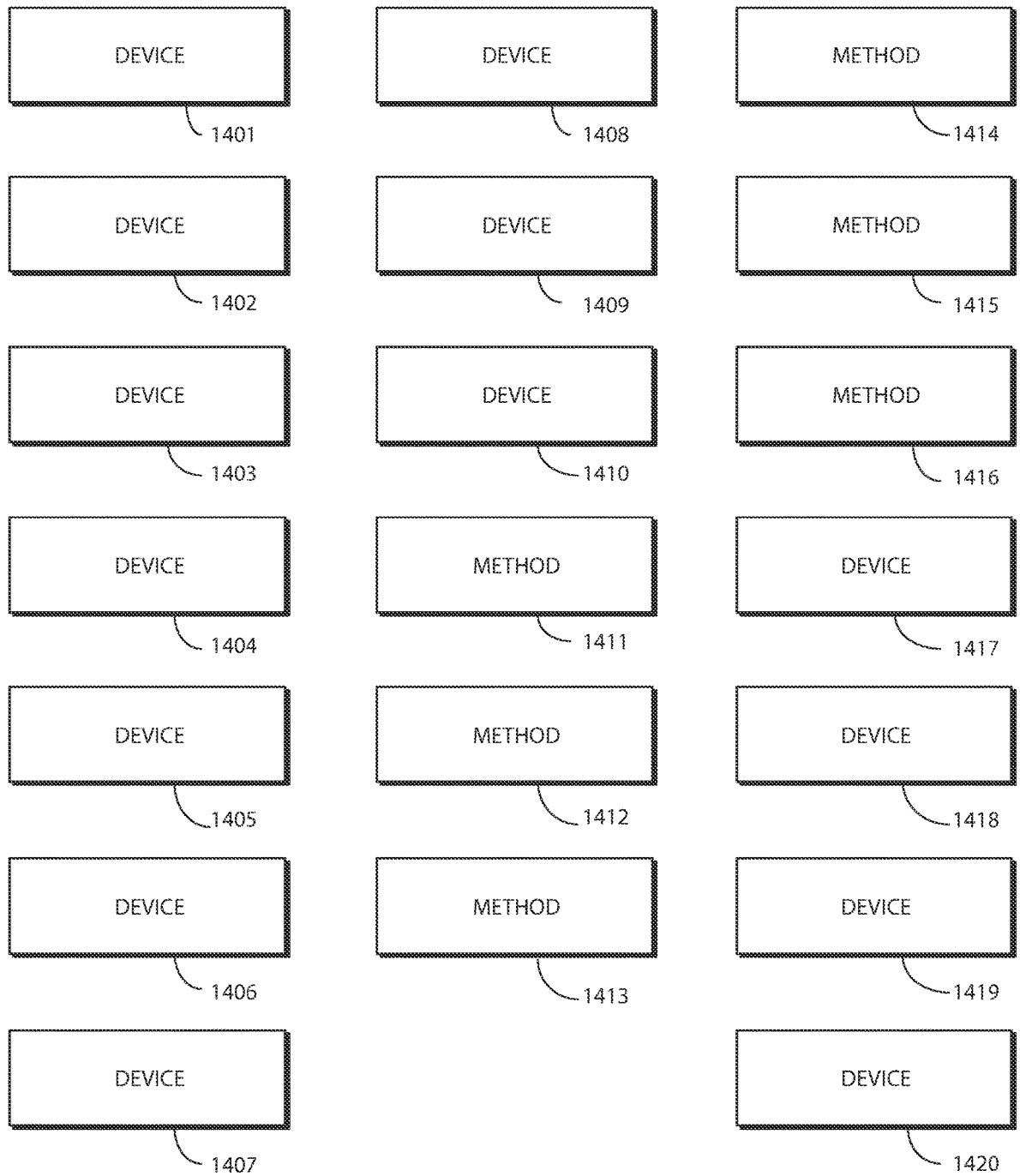
FIG. 14 illustrates one or more embodiments of the disclosure.

Turning now to FIG. 14, illustrated therein are various embodiments of the disclosure. The embodiments of FIG. 14 are shown as labeled boxes in FIG. 14 due to the fact that the individual components of these embodiments have been illustrated in detail in FIGS. 1-13, which precede FIG. 14. Accordingly, since these items have previously been illustrated and described, their repeated illustration is no longer essential for a proper understanding of these embodiments. Thus, the embodiments are shown as labeled boxes.

At 1401, a conferencing system terminal device comprises a communication device electronically in communication with a content presentation companion device operating as a primary display for the conferencing system terminal device during a videoconference. At 1401, the conferencing system terminal device comprises an image capture device of the conferencing system terminal device capturing one or more images of a subject for presentation on the content presentation companion device during the videoconference.

At 1401, the conferencing system terminal device comprises one or more sensors and one or more processors. At 1401, the one or more processors apply a mirroring function to the one or more images of the subject when operating in a normal videoconference mode of operation and, in response to the one or more sensors detecting initiation of a demonstration operation by the subject, transition to a demonstration videoconference mode of operation where application of the mirroring function to the one or more images of the subject is precluded.

At 1402, the one or more processors of 1401 transition from the demonstration videoconference mode of operation back to the normal videoconference mode of operation, again applying the mirroring function to the one or more images of the subject, in response to the one or more sensors detecting a cessation of the demonstration operation. At 1403, the conferencing system terminal device of 1402 further comprises a communication device transmitting the one or more images of the subject to at least one remote electronic device engaged in the videoconference without the mirroring function applied to the one or more images of the subject.

At 1404, the one or more processors of 1401 further determine, using the one or more sensors, whether the conferencing system terminal device is moving. At 1404, the one or more processors transition to the demonstration videoconference mode of operation only when the conferencing system terminal device is substantially stationary.

At 1405, the one or more processors of 1404 further detect, using the one or more sensors, the conferencing system terminal device being coupled to a docking station. At 1405, the one or more processors transition to the demonstration videoconference mode of operation only when the conferencing system terminal device is coupled to the docking station.

At 1406, the one or more sensors of 1401 detect the initiation of the demonstration operation by detecting a hand of the subject moving into a field of view of the image capture device. At 1407, the one or more sensors of 1401 detect the initiation of the demonstration operation by detecting a hand of the subject holding an object moving into a field of view of the image capture device.

At 1408, the demonstration operation of 1401 employs a demonstration object having text printed thereon. At 1409, the preclusion of the application of the mirroring function of 1408 results in depictions of the text from the one or more images of the subject on the content presentation companion device running from a left side of the content presentation companion device toward a right side of the content presentation companion device.

At 1410, a method in a conferencing system terminal device comprises detecting, with one or more processors of the conferencing system terminal device, a communication device of the conferencing system terminal device electronically in communication with a content presentation companion device operating as a primary display for the conferencing system terminal device while an image capture device of the conferencing system terminal device captures one or more images from an environment of the conferencing system terminal device for presentation on the content presentation companion device.

At 1410, the method comprises applying, by one or more processors of the conferencing system terminal device, a mirroring function to the one or more images of from the environment being presented on the content presentation companion device when operating in a normal mode of operation. At 1410, in response to one or more sensors of the conferencing system terminal device detecting initiation of a demonstration operation employing a demonstration object occurring in the environment of the conferencing system terminal device, the method comprises transitioning, by the one or more processors from the normal mode of operation to a demonstration mode of operation and precluding application of the mirroring function to the one or more images from the environment being presented on the content presentation companion device.

At 1411, the method of 1410 further comprises transmitting, with a communication device operable with the one or more processors, the one or more images from the environment without application of the mirroring function across a network to another conferencing system terminal device when operating in the normal mode of operation. At 1412, the method of 1410 further comprises transitioning from the demonstration operation mode of operation to the normal mode of operation in response to the one or more sensors detecting a cessation of the demonstration operation. At 1413, the transitioning to the demonstration videoconference mode of operation of 1410 occurs only in response to the one or more sensors determining the demonstration object comprises text.

At 1414, the method of 1410 further comprises detecting, by the one or more processors, the conferencing system terminal device comprising another image capture device. At 1414, the application of the mirroring function to other images from the environment of the conferencing system terminal device captured by the other image capture device is precluded in the normal mode of operation.

At 1415, the transitioning to the demonstration videoconference mode of operation of 1410 occurs only in response to the one or more sensors determining the conferencing system terminal device is stationary. At 1416, the transitioning to the demonstration videoconference mode of operation of 1410 occurs only in response to the one or more sensors determining the conferencing system terminal device is docked.

At 1417, a conferencing system terminal device comprises a communication device electronically in communication with a content presentation companion device operating as a primary display for the conferencing system terminal device during a videoconference. At 1417, the conferencing system terminal device comprises a first image capture device situated on a first surface of the conferencing system terminal device and having a first field of view extending away from the first surface in a first direction.

At 1417, the conferencing system terminal device further comprises a second image capture device situated on a second surface of the conferencing system terminal device having a second field of view extending away from the second surface in a second direction. At 1417, the conferencing system terminal device comprises one or more sensors and one or more processors.

At 1417, the one or more processors select an image capture device selected from the first image capture device and the second image capture device that is oriented toward a subject. AT 1417, the one or more processors cause the image capture device oriented toward the subject to capture one or more images for presentation on the content presentation companion device during the videoconference.

At 1417, the one or more processors apply a mirroring function to the one or more images when operating in a normal videoconference mode of operation. However, at 1417, and in response to the one or more sensors detecting initiation of a demonstration operation by the subject, the one or more processors transition to a demonstration videoconference mode of operation where application of the mirroring function to the one or more images is precluded.

At 1418, the conferencing system terminal device of 1417 comprises a first device housing that is pivotable about a hinge relative to a second device housing between an axially displaced open position and a closed position. At 1419, the one or more processors of 1417 preclude application of the mirroring function to images captured by another image capture device selected from the first image capture device and the second image capture device when in the normal videoconference mode of operation. At 1420, the one or more processors of 1417 select the image capture device as a function of a geometry of the conferencing system terminal device.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A conferencing system terminal device, comprising:
   a communication device electronically in communication with a content presentation companion device operating as a primary display for the conferencing system terminal device during a videoconference;
   an image capture device of the conferencing system terminal device capturing one or more images of a subject for presentation on the content presentation companion device during the videoconference;
   one or more sensors; and
   one or more processors, wherein the one or more processors:
   apply a mirroring function to the one or more images of the subject when operating in a normal videoconference mode of operation;
   in response to the one or more sensors detecting initiation of a demonstration operation by the subject, transition to a demonstration videoconference mode of operation where application of the mirroring function to the one or more images of the subject is precluded; and
   transition from the demonstration videoconference mode of operation back to the normal videoconference mode of operation and again apply the mirroring function to the one or more images of the subject in response to the one or more sensors detecting a cessation of the demonstration operation;
   the conferencing system terminal device further comprising a communication device transmitting the one or more images of the subject to at least one remote electronic device engaged in the videoconference without the mirroring function applied to the one or more images of the subject.

2. The conferencing system terminal device of claim 1, the one or more sensors detecting the initiation of the demonstration operation by detecting a hand of a participant picking up an object and moving the object within a field of view of the image capture device.

3. The conferencing system terminal device of claim 1, the one or more sensors detecting the initiation of the demonstration operation from text-based correspondence associated with the videoconference.

4. The conferencing system terminal device of claim 1, the one or more processors further determining, using the one or more sensors, whether the conferencing system terminal device is moving, wherein the one or more processors transition to the demonstration videoconference mode of operation only when the conferencing system terminal device is substantially stationary.

5. The conferencing system terminal device of claim 1, the one or more processors further detecting, using the one or more sensors, the conferencing system terminal device being coupled to a docking station, wherein the one or more processors transition to the demonstration videoconference mode of operation only when the conferencing system terminal device is coupled to the docking station.

6. The conferencing system terminal device of claim 1, the one or more sensors detecting the initiation of the demonstration operation by detecting a hand of the subject moving into a field of view of the image capture device.

7. The conferencing system terminal device of claim 1, the one or more sensors detecting the initiation of the demonstration operation by detecting a hand of the subject holding an object moving into a field of view of the image capture device.

8. The conferencing system terminal device of claim 1, the demonstration operation employing a demonstration object having text printed thereon.

9. The conferencing system terminal device of claim 8, wherein preclusion of the application of the mirroring function results in depictions of the text from the one or more images of the subject on the content presentation companion device running from a left side of the content presentation companion device toward a right side of the content presentation companion device.

10. A method in a conferencing system terminal device, the method comprising:
  detecting, with one or more processors of the conferencing system terminal device, a communication device of the conferencing system terminal device electronically in communication with a content presentation companion device operating as a primary display for the conferencing system terminal device while an image capture device of the conferencing system terminal device captures one or more images from an environment of the conferencing system terminal device for presentation on the content presentation companion device;
  applying, by one or more processors of the conferencing system terminal device, a mirroring function to the one or more images of from the environment being presented on the content presentation companion device when operating in a normal mode of operation; and
  in response to one or more sensors of the conferencing system terminal device detecting initiation of a demonstration operation employing a demonstration object occurring in the environment of the conferencing system terminal device transitioning, by the one or more processors from the normal mode of operation to a demonstration mode of operation and precluding application of the mirroring function to the one or more images from the environment being presented on the content presentation companion device;
  wherein the transitioning to the demonstration operation mode of operation occurs only in response to the one or more sensors determining the conferencing system terminal device is stationary.

11. The method of claim 10, further comprising transmitting, with a communication device operable with the one or more processors, the one or more images from the environment without application of the mirroring function across a network to another conferencing system terminal device when operating in the normal mode of operation.

12. The method of claim 10, further comprising transitioning from the demonstration operation mode of operation to the normal mode of operation in response to the one or more sensors detecting a cessation of the demonstration operation.

13. The method of claim 10, wherein the transitioning to the demonstration operation mode of operation occurs only in response to the one or more sensors determining the demonstration object comprises text.

14. The method of claim 10, further comprising detecting, by the one or more processors, the conferencing system terminal device comprising another image capture device, wherein application of the mirroring function to other images from the environment of the conferencing system terminal device captured by the another image capture device is precluded in the normal mode of operation.

15. The method of claim 10, wherein the one or more sensors detect the initiation of the demonstration operation from audio content.

16. The method of claim 10, wherein the transitioning to the demonstration operation mode of operation occurs only in response to the one or more sensors determining the conferencing system terminal device is docked.

17. A conferencing system terminal device, comprising:
  a communication device electronically in communication with a content presentation companion device operating as a primary display for the conferencing system terminal device during a videoconference;
  a first image capture device situated on a first surface of the conferencing system terminal device and having a first field of view extending away from the first surface in a first direction;
  a second image capture device situated on a second surface of the conferencing system terminal device having a second field of view extending away from the second surface in a second direction;
  one or more sensors; and
  one or more processors, wherein the one or more processors:
    select an image capture device selected from the first image capture device and the second image capture device that is oriented toward a subject;
    cause the image capture device oriented toward the subject to capture one or more images for presentation on the content presentation companion device during the videoconference;
    apply a mirroring function to the one or more images when operating in a normal videoconference mode of operation; and in response to the one or more sensors detecting initiation of a demonstration operation by the subject, transition to a demonstration videoconference mode of operation where application of the mirroring function to the one or more images is precluded.

18. The conferencing system terminal device of claim 17, wherein the conferencing system terminal device comprises a first device housing that is pivotable about a hinge relative to a second device housing between an axially displaced open position and a closed position.

19. The conferencing system terminal device of claim 17, the one or more processors precluding application of the mirroring function to images captured by another image capture device selected from the first image capture device and the second image capture device when in the normal videoconference mode of operation.

20. The conferencing system terminal device of claim 17, wherein the one or more processors select the image capture device as a function of a geometry of the conferencing system terminal device.

\* \* \* \* \*